(12) United States Patent
Wirts et al.

(10) Patent No.: US 7,076,766 B2
(45) Date of Patent: Jul. 11, 2006

(54) SOFTWARE APPLICATION DEVELOPMENT METHODS AND FRAMEWORK

(76) Inventors: Steve Wirts, 194 River Side Dr. #A, New York, NY (US) 10025; Gary Albelli, 408 Clinton Ave., Northvale, NJ (US) 07647; Eric Lazarus, 420 Central Park West, Suite 5G, New York, NY (US) 10025-4313

( * ) Notice: Subject to any disclaimer, the term of this patent is extended or adjusted under 35 U.S.C. 154(b) by 649 days.

(21) Appl. No.: 10/158,911

(22) Filed: Jun. 3, 2002

(65) Prior Publication Data

US 2003/0226111 A1 Dec. 4, 2003

(51) Int. Cl.
*G06F 9/45* (2006.01)

(52) U.S. Cl. .................................... 717/121
(58) Field of Classification Search ............. 717/116, 717/762, 121
See application file for complete search history.

(56) References Cited

U.S. PATENT DOCUMENTS

| | | | | |
|---|---|---|---|---|
| 5,630,131 A | * | 5/1997 | Palevich et al. | 717/108 |
| 5,754,173 A | | 5/1998 | Hiura et al. | 345/333 |
| 5,987,247 A | * | 11/1999 | Lau | 717/100 |
| 6,023,271 A | | 2/2000 | Quaeler-Bock et al. | 345/335 |
| 6,128,606 A | * | 10/2000 | Bengio et al. | 706/10 |
| 6,173,439 B1 | * | 1/2001 | Carlson et al. | 717/108 |
| 6,332,210 B1 | | 12/2001 | Barkataki et al. | 717/1 |
| 6,502,236 B1 | * | 12/2002 | Allen et al. | 717/136 |
| 6,721,807 B1 | * | 4/2004 | Vlissides | 719/315 |
| 2002/0046240 A1 | | 4/2002 | Graham et al. | 709/203 |
| 2002/0099866 A1 | * | 7/2002 | Vlissides | 709/315 |

FOREIGN PATENT DOCUMENTS

EP 1156428 A2 11/2001

OTHER PUBLICATIONS

"A Description of the Model-View-Controller User Interface Paradigm in the Smalltalk-80 System," *ParPlace Systems*, 1988.
"Coupling Application Design and User Interface Design," *Association for Computing Machinery*, May 1992, pp. 259-266.
"Oracle9i Application Server —Forms Services," <http://otn.oracle.com/products/forms/htdocs/91forms_fov.htm>.
"Oracle9i jDeveloper New Feature Overview," <http://otn.oracle.com/products/jdev/htdocs/jdev9i902_fo.html>.

(Continued)

*Primary Examiner*—John Chavis
(74) *Attorney, Agent, or Firm*—Lacasse & Associates, LLC; Randy W. Lacasse; Ramraj Soundararajan

(57) ABSTRACT

Described is a framework that enables a Delegating Visitor Pattern. In the Delegating Visitor Pattern, a visitor object (a) performs operations on a parent object; (b) selects which objects are child objects of the parent object; and (c) selects a child visitor object for each of the child objects. In one embodiment, the framework is one for developing user interfaces that enables a programmer to use Mirror Composition to construct user interfaces. Mirror Composition is an extension of the model-view-controller paradigm. In Mirror Composition, the UI is generated from a tree of view objects, where each view object is an object editor that provides for the modification and viewing of an underlying domain object. The tree of the view objects closely mirrors the tree of the domain objects.

61 Claims, 24 Drawing Sheets

OTHER PUBLICATIONS

"Oracle9i Reports Tutorial," Oracle Corporation, 2002, Release 9.0.

"Refactorings: Separate Domain from Presentation," <http://www.smalltalkchronicles.net/edition3-2/Pages/separateddomain frompresentation.htm>.

Betz et al., "Developing Highly-Reponsive User Interfaces with DHTML and Servlets," *Proceeding of the IEEE International Conference on Performance, Computing, and Communications*, Feb. 20-22, 2000, pp. 437-443.

Gamma, "Design Patterns: Elements of Reusable Object-Software," Addison-Wesley, Reading, Mass., 1995, pp. 331-344.

Knight et al., "Objects and the Web," *IEEE Software*, Mar.-Apr. 2002, vol. 19, Issue 2 pp. 51-59.

Leff et al., "Web-Application Development Using the Model/View/Controller Design Pattern" *Proceeding of the Fifth IEEE International Enterprise Distributed Object Computing Conference*, Sep. 4-7 2001, pp. 118-127.

Lin et al., "A Java-based Method for Developing Web Application System," *Fifth Asia-Pacific Conference on Communications and Fourth Optoelectronics and Communications Conference*, Oct. 18-22, 1999, vol. 2, pp. 1079-1082.

Punkka, "Intelligent Reusable User Interface Components," The X Resource, vol. 13, No. 1, 1995, pp. 201-215.

Rasala et al., "Java Power Tools: Model Software for Teaching Object-Oriented Design," *Proceedings of the 32nd SIGCSE Technical Symposium on Computer Science Education*, ACM Press, 2001, pp. 297-301.

Ship, "Build Feature-Rich World-Class Web Applications,"Java Report, vol. 5, No. 6, Jun. 2000, pp. 38-48.

* cited by examiner

/AddressBookView.jsp

Chomsky, Noam
Buckley, William add contact    remove

/PersonView.jsp first name: Noam
last name: Chomsky
phone number: 555-555-1212

/AddressView.jsp line one
line two
city: Cambridge
state: Connecticut print  submit address submit  print  debug

SOFTWARE APPLICATION DEVELOPMENT METHODS AND FRAMEWORK

BACKGROUND OF THE INVENTION

The present invention relates generally to the field of object-oriented programming. More specifically, to object oriented frameworks.

Object oriented programming represents a body of programming in which programmers define not only the data type of a data structure, but also the operations (functions) that can be applied to those data structure. In this way, the data structure becomes an object that includes both data and functions. In addition, programmers can create relationships between one object and another and objects can inherit characteristics from other objects.

One of the principal advantages of object-oriented programming techniques over procedural programming techniques is that they enable programmers to create modules that do not need to be changed when a new type of object is added. A programmer can simply create a new object that inherits many of its features from existing objects. This makes object-oriented programs easier to modify. Programmers perform object-oriented programming far more conveniently in an object-oriented programming language (OOPL). Java, C++ and Smalltalk are three of the more famous languages, and there are also object-oriented versions of Pascal.

Most software systems have some type of graphical user interface (UI). In traditional software prototyping and development, the software designer builds the interface with direct coupling to one or more dispersed business rules. A general overview is illustrated in FIG. 1. As shown, UI 100 comprises a number of "widgets," (or "controls") 102, which can be text boxes, combo boxes, buttons, etc. When the state of a UI widget changes, or causes an event, the corresponding code and business rules are invoked to handle the change or event so as to accomplish the functions of the software application. The code and rules may access database 106 to retrieve information, perform calculations, etc. This merging of user-interface and business logic is even more common in the systems that are most famous for rapid construction. This style of system construction loses much of the benefit of object technology, especially in terms of the management of program complexity and the ease with which new capabilities can be added to an application as requirements change.

Because user interfaces are generally coded with the programmer having to think in terms of the management of events and states, the process becomes complicated quickly. Hence, the interface often takes more effort and code than the business logic. The complexity increases even more for web-based applications. HTTP/HTML is fundamentally a low-level building block, too low to construct easily maintainable systems. A developer needs to be concerned about far too many technical details, while working with browsers that were not designed to support the demands of contemporary user interfaces. Improvements have been made incrementally, but good programming abstractions have not been the result. Building web interfaces today involves a large mismatch between what the web applications need to do and what HTTP/HTML expresses easily.

Many times, in a design process, early development of a small-scale prototype is used to test certain key features of the design. Prototypes are extremely useful in important ways to reduce risk on software development projects. For instance, good prototypes can serve as the foundation of the eventual delivered system. Also, when a prototype is available early, the problem of miscommunication between developers and users, analysts and executives is greatly reduced.

The difficulty of programming user interfaces, however, normally inhibits the rapid development of "foundational" prototypes, i.e. prototypes that serve as the foundation of the eventual delivered system. Thus, if the complexity in the UI code could be reduced, they could be built quickly, which would then make it possible to provide prototypes earlier in the design process.

There are also other advantages to reducing the complexity of the UI code. Often, the complexity in an application is in the presentation layer. If the size of that portion of the code is reduced dramatically, the maintainability of the delivered software is improved. Software maintenance is often among the greatest costs in the software life cycle. Therefore, if the complexity of presentation layer software can reduced so that it can be built rapidly, software-project return on investment (ROI) can be dramatically improved.

What is needed is a framework and allied tools that enable a software developer to easily create software systems that have arbitrarily complex UIs, where the UI can be coded quickly and with reduced complexity. Such a framework and tools would enable rapid foundational prototyping.

SUMMARY OF THE INVENTION

One aspect of the present invention provides a method of programming a user interface for a software application comprising a tree of editable domain objects. The method comprises creating a tree of view objects, wherein each view object in the tree is an editor of a corresponding editable domain object in the tree of editable domain objects. Each view object in the tree of view objects generates an editor panel of the user interface such that the user interface is a composition of editor panels.

Another aspect of the present invention provides an article of manufacture comprising a computer user medium having computer readable program code embodied therein which implements a user interface framework. The computer readable program code comprises computer readable program code for creating a tree of view objects, wherein each view object in the tree of view objects is an editor of a corresponding editable domain object in a tree of domain objects. Each view object in the tree of view objects generates an editor panel of the user interface such that the user interface is a composition of editor panels.

Another aspect of the present invention provides a framework comprising an inclusion mechanism to construct a visitor object that (a) performs operations on a root object; (b) selects which objects are child objects of the root object; and (c) selects a child visitor object for each of the child objects.

Another aspect of the present invention provides an article of manufacture comprising a computer user medium having computer readable program code embodied therein which implements a framework. The computer readable program code comprises computer readable program code for constructing a visitor object that (a) performs operations on a root object; (b) selects which objects are child objects of the root object; and (c) selects a visitor object for each of the child objects.

Another aspect of the present invention provides a framework for developing a user interface for an application comprising a tree of editable domain objects. The framework comprises an inclusion mechanism to include at least one sub-view object in a view object so as to form a tree of view objects. Each view object in the tree of view objects is an editor of a corresponding editable domain object in the tree of domain objects and generates an editor panel of the user interface such that the user interface is a composition of editor panels. The framework also comprises an Editor Context class. An instance of the Editor Context class is instantiated for each view object in the tree of view objects and associated with the view object's corresponding domain object. The Editor Context instance functions as a namespace for editing of the corresponding editable domain object.

BRIEF DESCRIPTION OF THE DRAWINGS

FIG. 7 illustrates a generated UI;

FIG. 10b illustrates exemplary decorations to identify the parameter and names of the various editor panels when debugging is turned on;

DETAILED DESCRIPTION

Figure 1:
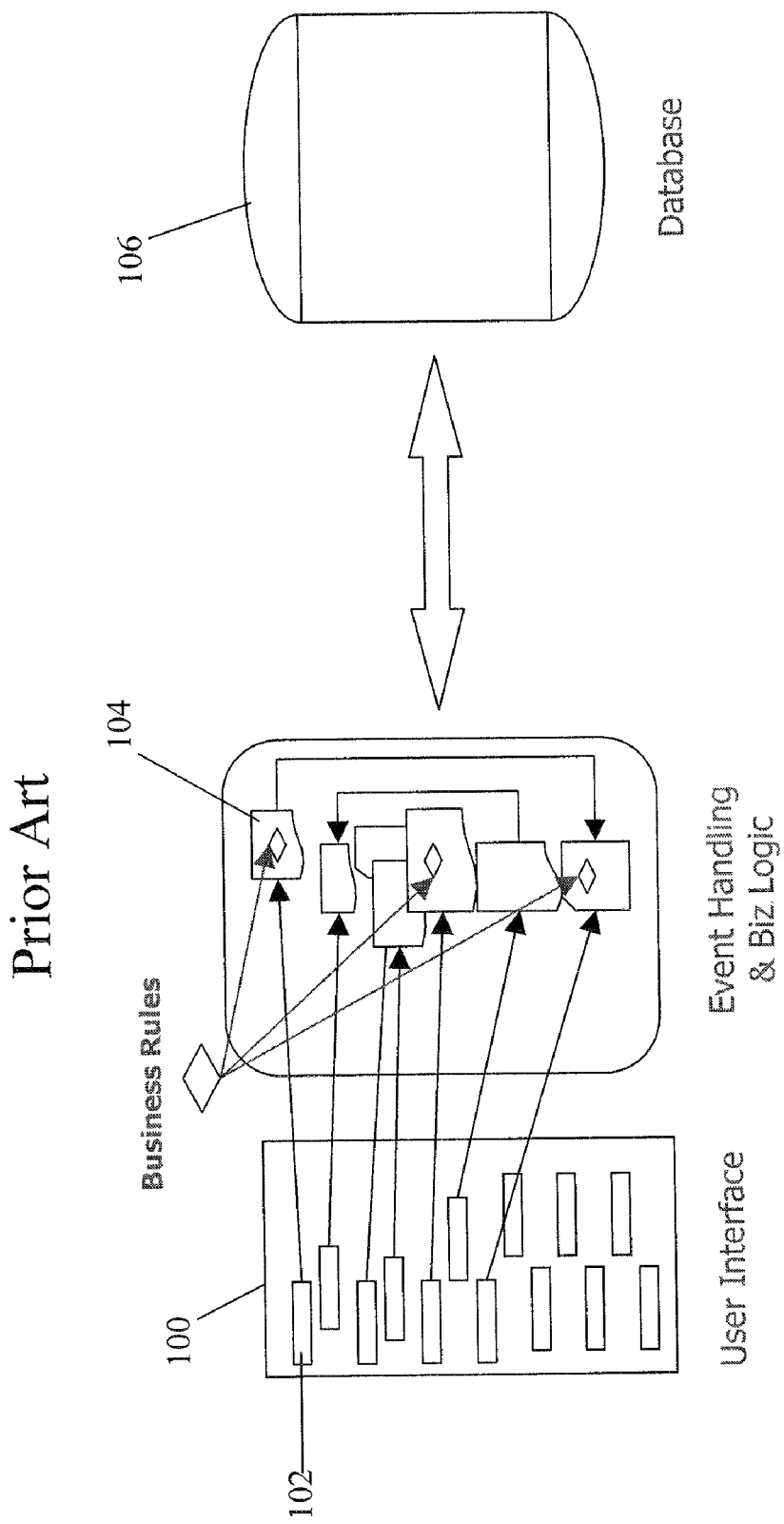
FIG. 1 illustrates the typical technique for software prototyping and development.

The present invention may be produced in many different configurations and forms. There are depicted in the drawings, and will herein be described in detail, one or more embodiments of the invention, with the understanding that the present disclosure is to be considered as an exemplification of the principles of the invention and the associated functional specifications for its construction and is not intended to limit the invention to the embodiment(s) illustrated. Those skilled in the art will envision many other possible variations within the scope of the present invention.

Overview

In one aspect, the present invention alleviates the aforementioned difficulties, and provides additional advantages as will be appreciated by one of skill in the art, by providing a framework that enables a "delegating" visitor pattern. A conventional visitor pattern provides an alternative way to implement operations on an object tree without providing the logic in each class to support the operation. This is accomplished by putting all of the logic to implement the operation in a separate visitor class. A visitor object then "walks" the object tree, at each node "invited" to perform the appropriate operation on each node. By separating the structure of an object collection from the operations performed on that collection, the visitor pattern allows new operations to be defined without adding or modifying the methods in the classes of the objects on which the visitor operates. The conventional visitor pattern is described in "Design Patterns: Elements of Reusable Object-Oriented Software" by Erich Gamma, Richard Helm, Ralph Johnson, John Vlissides, Addison Wesley Professional Computing Series, October 1994.

Figure 2:
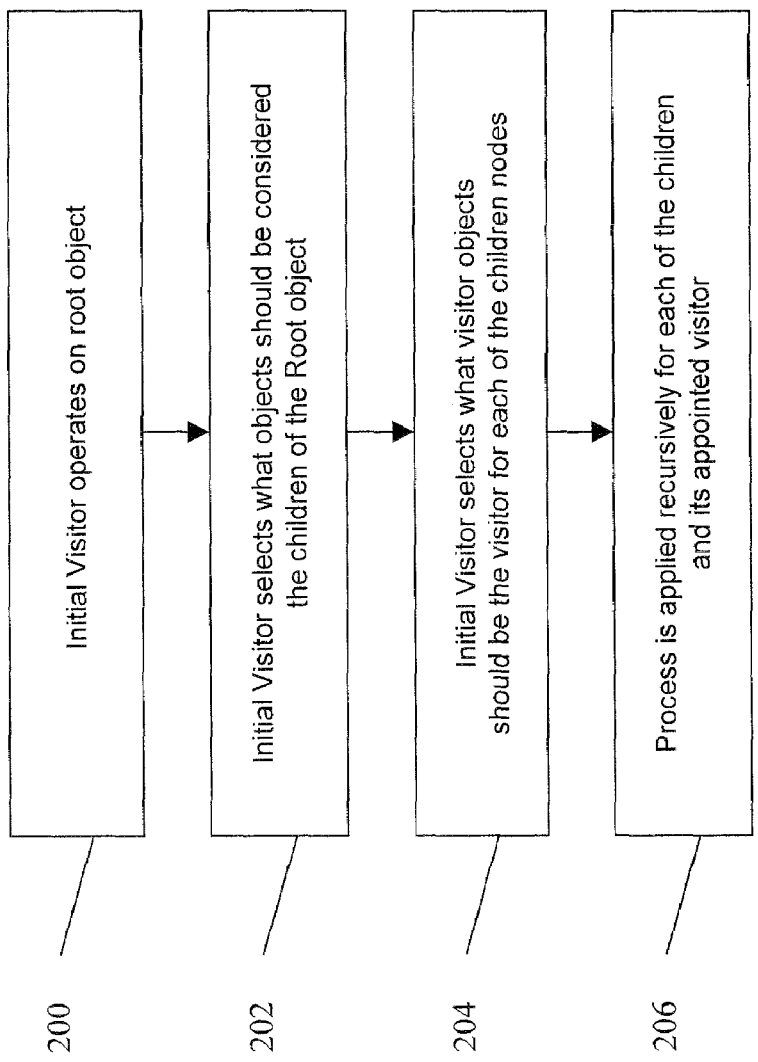
FIG. 2 illustrates the Delegating Visitor Pattern in flow chart form.

In addition to the advantages of the conventional visitor pattern, the Delegating Visitor Pattern according to the present invention provides the advantage of context-sensitive processing. FIG. 2 illustrates the Delegating Visitor Pattern in flow chart form. As shown, in the Delegating Visitor Pattern, the initial visitor object performs its operations on the root object in the object tree (step 200). The initial visitor object then selects which objects are considered child objects of the root object (step 202). This is in contrast to the conventional visitor pattern, in which each object selects its child objects. Once the child objects are selected, the initial visitor object then selects which visitor object visits each child object (step 204). This is again in contrast to the conventional visitor pattern, in which the same visitor object that operates on the root node is passed to each child node. In the Delegating Visitor Pattern, the initial visitor can choose the next visitor object explicitly, or it can "ask" the child object what visitor object should be used on it. This process is then applied recursively for each child object and its appointed visitor object (step 206).

In a particular implementation of the Delegating Visitor Pattern, each visitor is a "transducer" object that performs operations on the object to produce result data that is generally sent to a single shared output stream. The use of a transducer object is advantageous in a number of processes. The following table lists some examples:

| Process | Objects | Transducer | Result Data |
| --- | --- | --- | --- |
| XML Serialization | Arbitrary Objects | Serialization Objects | XML |
| User Interface Rendering (thin client) | Domain Objects | View Objects | HTML, User Interface State Information |
| User Interface Rendering (thick client) | Domain Objects | View Objects | Graphics commands to a graphics context |
| Graphics Rendering | 2 or 3d polygons | Specialized Renderers | Graphic commands or display list files |
| Declarative Compiler | Source code syntax tree for a function or method in the source language (e.g., Java) | Declarative description of how to handle each type of source node | Target Language (assembly, byte code, etc.) |
| Human Language Translation | Parsed source natural language | Representation of what to do with type of node (may be declarative representation) | Frame representation of the content. |

A preferred embodiment of the present invention provides a framework and tools that allow a programmer to develop and deploy applications with complex UIs quickly, which makes it useful for building rapid prototypes or end systems. The ability to construct UIs quickly is accomplished by enabling the software developer to use Mirror Composition via the Delegating Visitor Pattern. By using Mirror Composition and correct factoring, highly maintainable user interfaces can be constructed rapidly nearly completely without any procedural code in them.

Mirror Composition is an extension of the model-view-controller (MVC) paradigm. In the MVC paradigm, the user input, the modeling of the external world, and the visual feedback to the user are explicitly separated and handled by three types of objects (view, controller, and model). The view manages the graphical and/or textual output to the user, i.e. the user interface. The controller interprets user inputs, such as mouse and keyboard inputs, and commands the model to change as appropriate. Finally, the model manages the behavior and data of the application domain, responds to requests for information about its state (usually from view objects), and responds to instructions to change state (usually from the controller).

In Mirror Composition, the model comprises a tree of domain objects, while the view comprises a tree of view objects, where each view object is an object editor. An object editor is a component that permits the user to view and modify an underlying domain object. Each object editor in the tree generally corresponds to a small number, normally one, of editable domain objects in the tree of domain objects. That is, there is generally no less than one object editor for each domain object that the user is going to be able to edit (editable domain object). Thus, the tree of view objects closely mirrors the tree of the underlying domain objects, i.e. as the model breaks down into its parts, the view breaks down into similar subviews.

Figure 3:
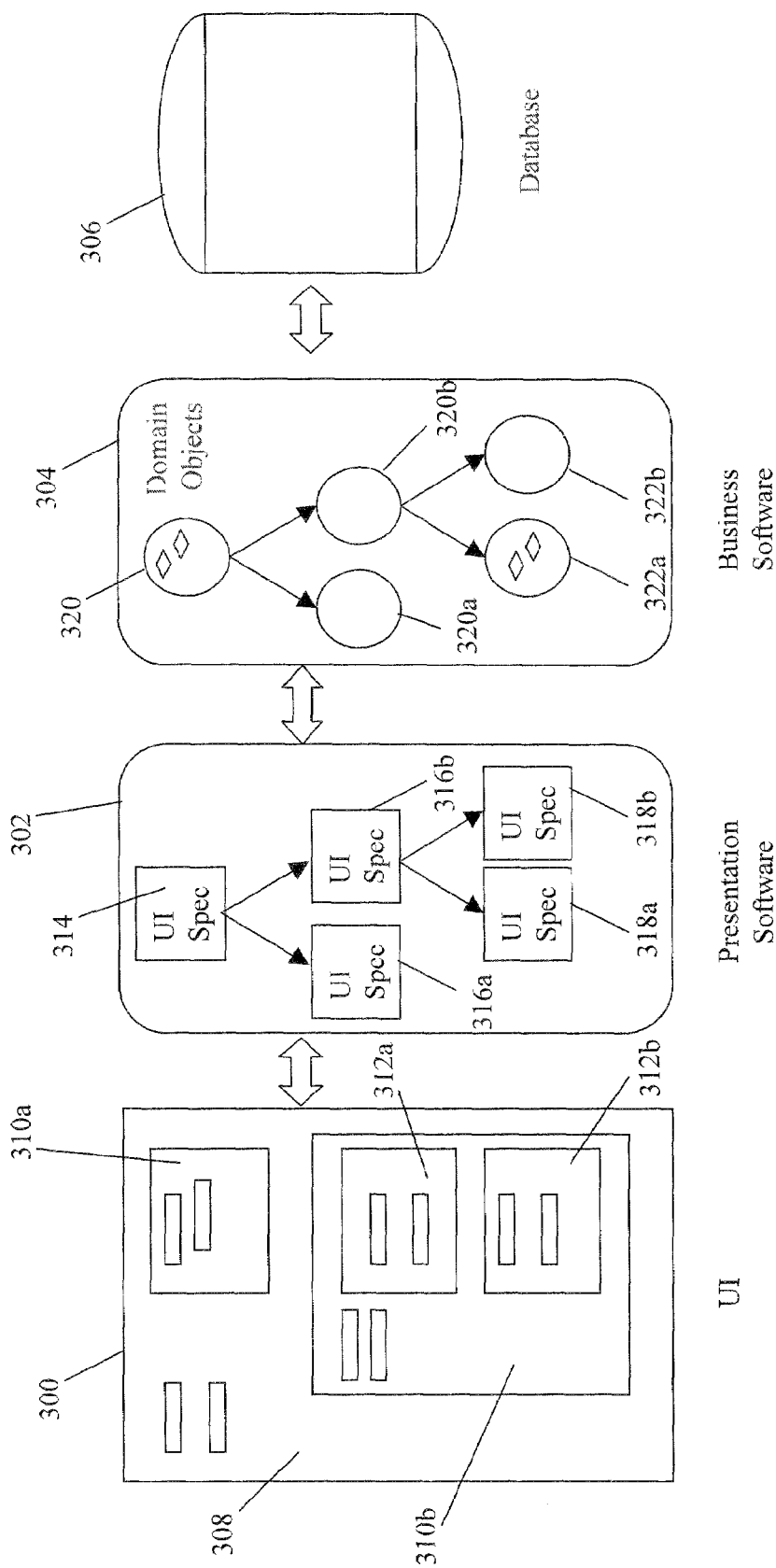
FIG. 3 conceptually illustrates Mirror Composition.

This is conceptually illustrated in FIG. 3. As shown, the business software 304 is developed as a domain object model. The domain object model is a graph of objects with consistently named property accessors. The objects include the actual business objects and objects that might model elements of the application itself. The business logic to accomplish the functions of the application is contained within the domain object model. The business software 304 accesses database 306, performs calculations, etc.

The presentation software (view) comprises a tree of view objects. The tree of view objects closely matches the tree of the domain objects, and each tree object is an object editor of its corresponding domain object. Thus, view object 314 is an editor of domain object 320; view objects 316a and 316b are editors of domain objects 320a and 320b respectively; and view objects 318a and 318b are editors of domain objects 322a and 322b respectively.

The resulting UI 300 is the composition of editor panels, where each view object generates an editor panel in the resulting UI 300. As illustrated, panel 308 is generated by view object 314. View object 314 includes view objects 316a and 316b. View objects 316a and 316b generate panels 310a and 310b. Thus, panel 308 contains panels 310a and 310b. Likewise, view object 316b includes view object 318a and 318b. Consequently, panel 310b contains panels 312a and 312b. For simplicity, controller objects have not been illustrated while explaining Mirror Composition.

Figure 4:
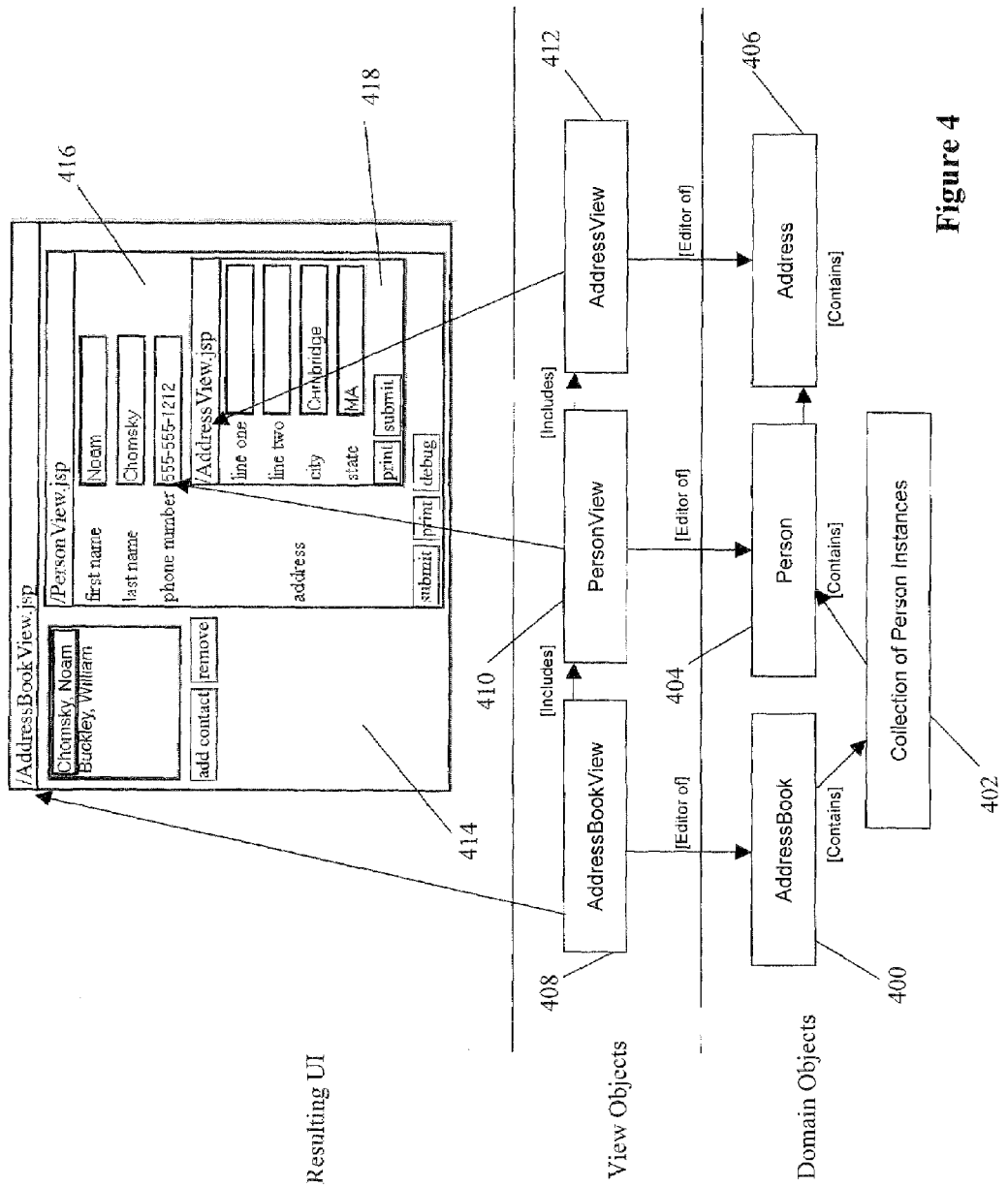
FIG. 4 illustrates an example of Mirror Composition for an exemplary address book application.

FIG. 4 illustrates an example of Mirror Composition for an exemplary address book application. The domain objects comprise address book objects, person objects, and address objects. An address book object 400 contains a collection of person objects 402. Each person object 404 contains an address object 406.

An address book view object 408 is an editor of address book object 400 and generates address book editor panel 414. A person view object 410 is an editor of person object 404 contained in address book object 400. Person view object 410 generates person view editor panel 416, which is contained in address book editor panel 414. Person view object 410 includes an address view object 412, which is a corresponding editor of address object 406. Address view object 412 generates address editor panel 418 contained in person editor panel 416.

Figure 5:
FIG. 5 illustrates a seamless interface generated from view objects.

Thus, a user can edit the properties of, for example, person object 404 via person editor panel 416. When the user changes properties such as last name and clicks the submit button, person object 404 is updated to reflect the changes made by the user. As will be appreciated by one of skill in the art, while the generated panels have been shown as visually demarcated for ease of explanation, in practice they may appear as one seamless interface. This is shown in FIG. 5.

Thus, in Mirror Composition, the UI is generated from a tree of view objects, where each view object is an object editor that provides for the modification and viewing of an underlying domain object. The tree of the view objects closely mirrors the tree of the domain objects. The UI is a composition of editor panels generated by the view objects. By providing an object editor for each underlying domain object, and having the tree of object editors mirror the tree of the domain objects, experience shows that arbitrarily complex UIs can be developed quickly.

The framework of the present invention provides the infrastructure to create such object editors for object editing and manipulation. As described, by using Mirror Composition and correct factoring (as will be described below), highly maintainable user interfaces can be constructed rapidly nearly completely without any procedural code in them. Thus, the framework preferably also includes the mechanisms that allow a programmer to perform the correct factoring, thereby allowing view objects to be developed using declarative specifications. Allowing a developer to create view objects declaratively, as opposed to procedurally, also reduces the complexity in the presentation layer software, allowing them to be constructed more quickly.

Computing Environment

Figure 6A:
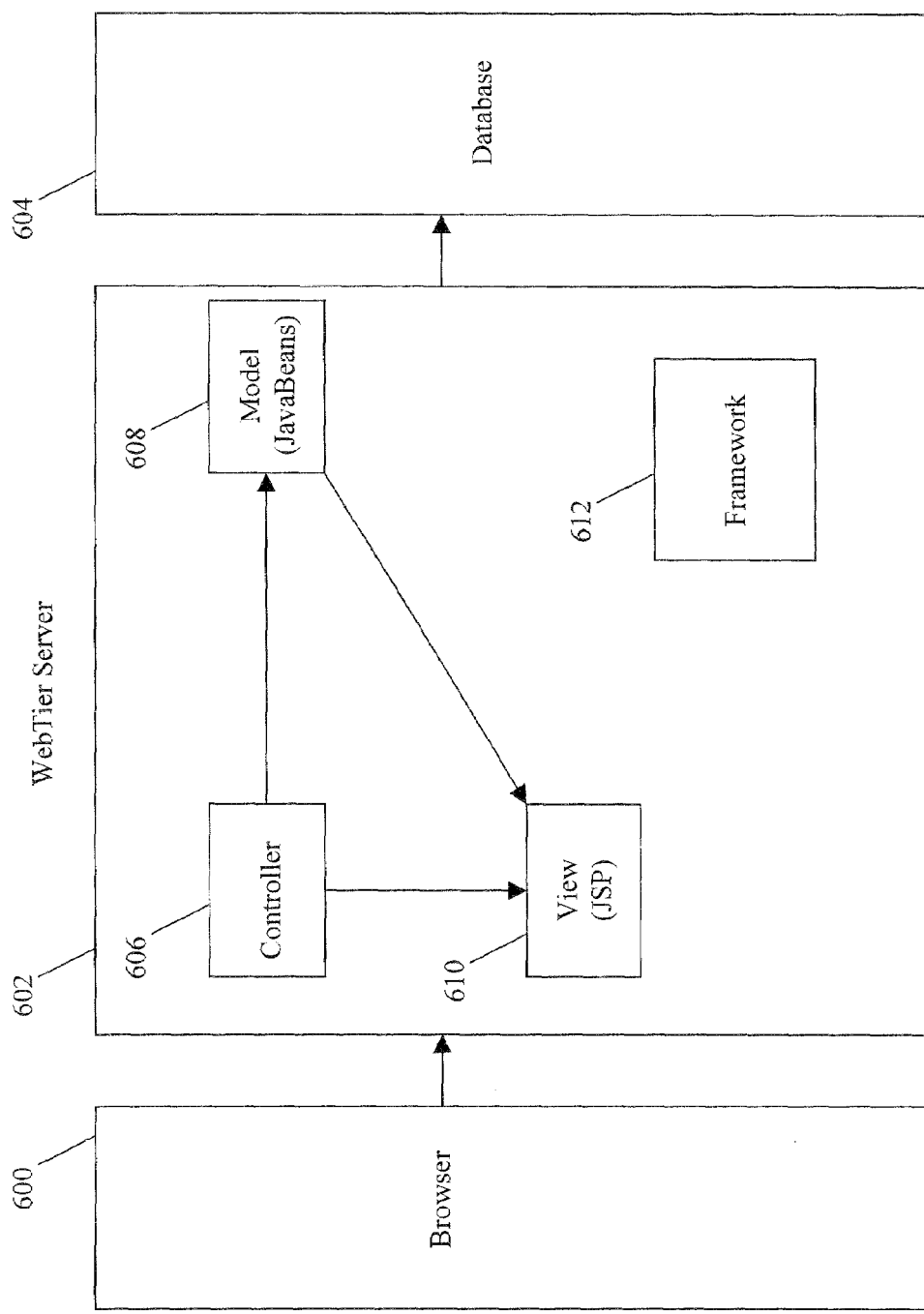
FIG. 6a illustrates a computing environment for the operation of the present invention.

FIG. 6a illustrates a computing environment for the operation of the present invention. In one embodiment, the framework and tools according to the present invention are implemented to support a multitiered distributed application model that has at least a client tier and a server tier. Preferably, the framework is implemented for a so-called thin-client environment, particularly a web-based environment. In a thin-client environment, most of the functionality is removed from the client tier (client program), and off-loaded to the server tier. This is in contrast to a thick-client environment, in which much of the functionality is implemented in the client program, software that is locally installed on a process near the end-user.

While the present disclosure describes an embodiment of the present invention for a thin client of a multitiered distributed application model, those of skill in the art will readily recognize that the principles of the present invention are readily adapted to a thick client environment, or to models other than multitiered distributed application models. Further, in one embodiment, processing is done using Java-based technologies, although other similar technologies may be used.

Thus, as shown in FIG. 6a, a client, such as a browser 600, communicates with server 602 via a network (not shown). Server 602 communicates with a database 604, also via a network. A framework 612 according to the present invention augments the server processing by providing an infrastructure connecting model 608, view 610, and controller 606 in a way that enables programmers to create view objects that are object editors. Framework 612 supports a class Controller for the controller 606, JavaBeans as the model 608, and Java Server Pages (JSPs) as the view 610. JSPs construct the UI as web pages that are sent to browser 600. The web pages constructed by the JSPs contain the appropriate HTML, JavaScript, etc. for browser 600 to render the UI to the user. In a preferred embodiment, framework 612 is packaged as a simple J2EE JSP Tag library.

In general, framework 612 comprises data and instructions which, when read, interpreted, and executed by server 602, cause server 602 to implement the present invention. Generally, the data and instructions are embodied in and readable from a device, carrier or media, such as memory, data storage devices, and/or remote devices coupled to server 602 via a data communications device (not shown).

Figure 6B:
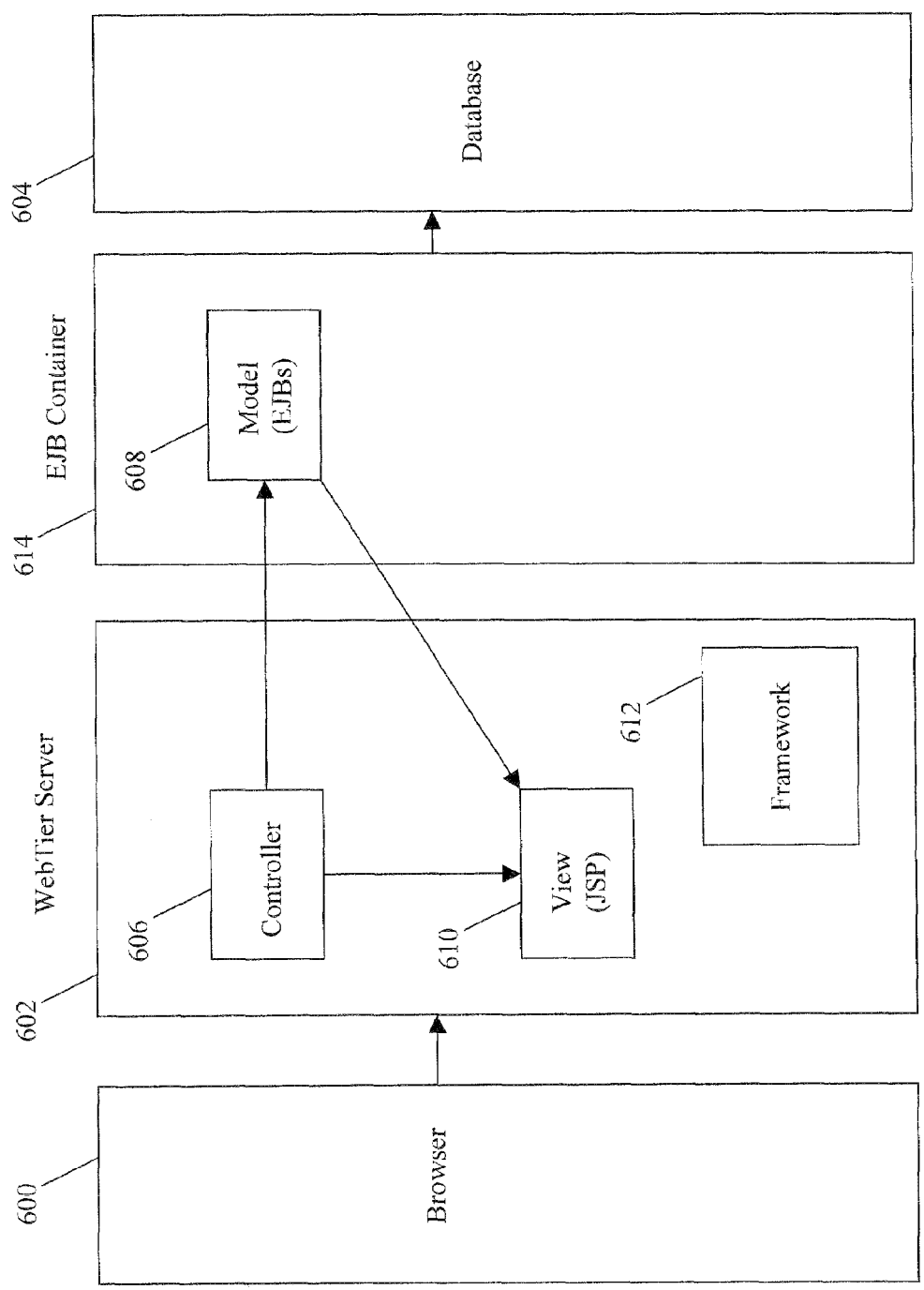
FIG. 6b illustrates another computing environment for the operation of the present invention.

FIG. 6b illustrates another computing environment for the operation of the present invention. This environment is the same as that of FIG. 6a, except it is an enterprise component environment. In this environment, the model 608 is Enterprise Java Beans (EJB) in an EJB container 614. EJB container 614 may be running on the same machine as server 602, or on a separate machine. Framework 612 still augments the server processing by providing an infrastructure connecting model 608, view 610, and controller 606 in a way that enables programmers to create view objects that are object editors.

Those skilled in the art will recognize that the exemplary environments illustrated in FIGS. 6a and 6b are not intended to limit the present invention. Indeed, those skilled in the art will recognize that other alternative computing environments may be used without departing from the scope of the present invention. The present invention may be implemented as a method, apparatus, or article of manufacture using standard programming and engineering techniques to produce software, hardware, firmware, or any combination thereof. In addition, the term "article of manufacture" as used herein is intended to encompass logic and data embodied in or accessible from any computer usable device, carrier, or media.

OPERATION OF THE INVENTION

As described, in a preferred embodiment framework 612 is packaged as a JSP Tag library so that the view objects are constructed as JSP pages using the tag library. The tags are specifically designed to enable designers to program UIs declaratively using Mirror Composition i.e. to declaratively construct object editors that edit underlying domain objects and then compose them into general UIs with as little procedural code as possible.

The following is an exemplary object editor (JSP) constructed using the tag library:

```
<%@ taglib uri="dss-taglib" prefix="mvc" %>
<mvc:editor model="getDefaultPerson" controller="addressbook.MyController">
    <table>
        <tr>
            <td>first name</td>
            <td><mvc:textfield property="firstName"/></td>
        </tr>
        <tr>
            <td>last name</td>
            <td><mvc:textfield property="lastName"/></td>
        </tr>
```

```
        <tr>
            <td>phone number</td>
            <td><mvc:textfield property="phoneNumber"/></td>
        </tr>
        <tr>
            <td>address</td>
            <td><mvc:subview property="address"
view="AddressView.jsp"/></td>
        </tr>
    </table>
    <mvc:button action="submit" label="submit"/>
    <mvc:button action="printPerson" label="print"/>
<mvc:button action="toggleDebug" label="debug"/>
</mvc:editor>
```

This object editor edits a person object, which is part of an address book application. As a convention, an object editor is named for the domain class it edits, with "View.jsp" appended to the end. Thus, the name of this object editor is PersonView.jsp. The first line of PersonView.jsp is the J2EE convention for using a custom tag library on this page. All content is enclosed in the "editor" tag, <mvc:editor>. The editor tag has two attributes, controller and model. The "controller" attribute specifies the name of a class, which is the controller for this page. The controller is typically stateless and so it is common to share the same controller across a great many pages, even an entire application. The "model" attribute is used to find an instance of the model. In "PersonView.jsp", "getDefaultPerson" will be invoked on the controller class "MyController" to obtain a domain instance as the model. MyController is a subclass of the class Controller supported by framework 612. The getDefaultAddress method of MyController is:

```
public Object getDefaultPerson() {
    return new Person();
}
```

This method is called once and the resulting object is cached in the session. This occurs when a page is the top-most page in a request, that is, when it does not have a containing page. This method returns an instance of the class Person, which is:

```
package addressbook;
public class Person {
    protected String firstName;
    protected String lastName;
    protected String phoneNumber;
    protected Address address;
    public Person() {
        super();
    }
    public Address getAddress() {
        if (address == null) setAddress(new Address());
        return address;
    }
    public String getFirstName() {
        if (firstName == null) setFirstName("");
        return firstName;
    }
    public String getLastName() {
        if (lastName == null) setLastName("");
        return lastName;
    }
```

```
public String getPhoneNumber() {
    if (phoneNumber == null) setPhoneNumber("");
    return phoneNumber;
}
public void setAddress(Address newAddress) {
    address = newAddress;
}
public void setFirstName(String newFirstName) {
    firstName = newFirstName;
}
public void setLastName(String newLastName) {
    lastName = newLastName;
}
public void setPhoneNumber(String newPhoneNumber) {
    phoneNumber = newPhoneNumber;
}
public void print() {
    System.out.println(this);
    System.out.println("first name: " + getFirstName());
    System.out.println("last name:" + getLastName());
    System.out.println("phone number: " + getPhoneNumber());
    System.out.println("-- address --");
    getAddress().print();
}
}
```

"Widget" tags are used to render controls (e.g., text field, list box, radio button, check box, etc.) that edit specific "properties" of the model. The tag <mvc:textfield> is an example of a "widget" tag. The property that the widget edits is designated by the "property" attribute. Thus, the tag <mvc:textfield property="firstName"/> renders a text field control that will read and write the contents of the property "firstName" on the current model, an instance of the class Person shown above. Framework 612 takes care of associating the widget with the property on the object that the editor edits. So, framework 612 provides a convenient way of designating what property a widget will edit, and handles associating the widget with that property.

It should be noted that an object can have properties containing any of several things:
  Primitive information (numbers, strings, etc.)
  Other domain objects (employees, departments, etc.), or
  Collections of other objects There is a "button" tag, <mvc:button>, that requires two attributes, action and label. The label is the text appearing on the button. The action is the name of a method that will be called on the pages' controller (MyController). In PersonView.jsp there is a "submit" button that invokes the "submit" method on MyController. The "submit" method lives in the superclass of MyController, "Controller," and serves as a convenience method to force a round trip to the server with no other effect. There is also a "print" button that invokes the "print" method on MyController. The "print" method in MyController is as follows:

```
public void printPerson(EditorContext aContext) {
    Person aPerson = (Person)aContext.getModel();
    aPerson.print();
}
```

This controller calls the print method on the person instance, which prints the person attributes to the screen. The controller does this by pulling the person object out of the "Editor Context." The Editor Context is a framework component that functions as a namespace for the object editor (JSP Page) and contains the state of the corresponding object. Each object editor instance maintains one Editor Context instance. The items stored in the namespace include:

The current model (object).
How to read and write properties on it.
A collection of arbitrary properties used to maintain the state of the user interface apart from the state of any domain object. An example of this is the currently selected item in a list widget. These properties are maintained in an Extra Properties Map.

Access to all object properties, and properties in the Extra Properties Map is the same. Location of the data is encapsulated; when accessing a property in the Editor Context, the programmer does not need to know if it is stored in the object or in the Extra Properties Map. Properties are set via the Editor Context's set method, set(property, data). Property is a string that is the name of the property being set, and data is the value the property is being set to. Property values are retrieved using the Editor Context's get method, get (property). Property is a string that is the name of the property being retrieved. Framework 612 insures that the values viewed in the corresponding View JSP Page are kept identical to what is in the Editor Context.

As described, framework 612 supports Mirror Composition (i.e. the user interface view objects mirror the structure of the underlying domain objects) via the Delegating Visitor Pattern. Framework 612 supports it by providing an "inclusion" mechanism that enables a developer to include subview objects (which are subeditors) into a view object. When framework 612 is packaged as a tag library, the main tool for building composite user interfaces is the <subview> tag, which conceptually has two properties, model and view. The model is the object the subview object will be called upon to edit. This can be a sub-object of the currently edited object, or the current object. The view is the subview object with which to edit the model.

It should be noted that, while an embodiment of the present invention provides an inclusion mechanism to construct delegating visitor objects generally, or more specifically, to construct view object trees, other mechanisms for constructing such objects are envisioned within the scope of the present invention.

In the above example, a Person contains an address object. In order to implement Mirror Composition, the <subview> tag is used to include an address object editor (i.e., a subview object) that edits the address object that the person contains) in PersonView.jsp. The child object (an address object) is indicated by the "property" attribute, while the subview object (AddressView.jsp) is indicated by the "view" attribute. AddressView.jsp is an object editor of the address object. This example illustrates a case in which the containing editor can directly specify what subview JSP to employ.

Preferably, framework 612 also allows the containing editor to "ask" the contained object what subview object is used to edit it. By allowing the contained object to indicate its subview object, systems that are more maintainable and flexible can be built. This is accomplished by using the viewProperty attribute, rather than the view attribute. For example, if the address class is edited to include the following method:

```
public String getPreferredEditor() {
    return "AddressView.jsp";
}
```

And the subview tag in PersonView.jsp is edited as follows:
<mvc:subview property="address" viewProperty="getPreferredEditor"/>

Then the getPreferredEditor method will be called on the address object to return the subview that is used to edit it. In this case, it will return the string AddressView.jsp. While the function that returns the subview in the present example simply returns a particular subview, the function can perform complicated logic to determine which subview to return. For example, getPreferredEditor could determine what day of the week it is, and return a different subview based on what day it is. Also, multiple, differing functions can be defined for returning the subview. The developer can then use a particular one of the functions for the viewProperty attribute, depending upon what is needed.

Figure 7:
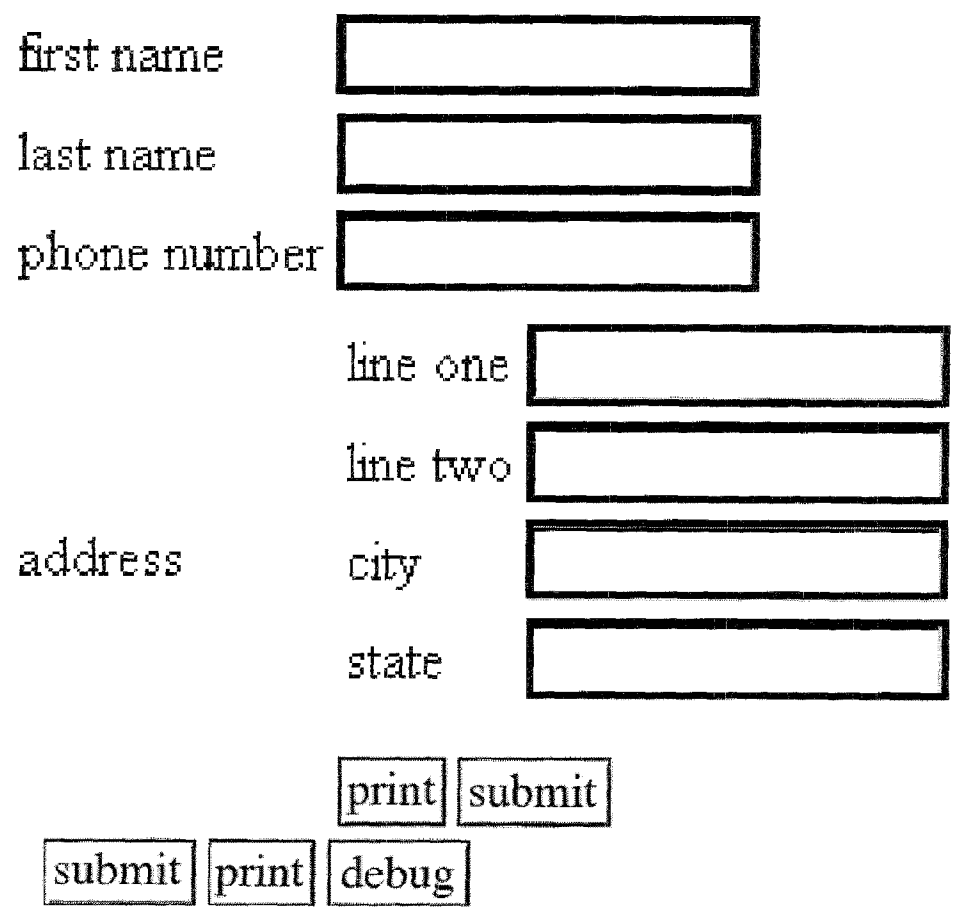

The generated UI is illustrated in FIG. 7. The textfields labeled line1, line2, city and state, along with the buttons immediately below these fields labeled print and submit, are the address panel generated by AddressView.jsp. This panel is contained within the person panel generated by PersonView.jsp.

By providing an inclusion mechanism that enables the Delegating Visitor Pattern and maintaining namespaces (Editor Contexts), framework 612 facilitates a programmer in creating view objects that are object editors, and to construct object editor trees that mirror the domain object tree (i.e., implementing Mirror Composition). The inclusion mechanism enables the Delegating Visitor Pattern at runtime by allowing an initial view object (i.e., initial visitor) to select a child object and the subview object (i.e., new visitor object) that operates on the child object (e.g., via the property and viewProperty attributes, respectively). Using the Delegating Visitor Pattern to implement Mirror Composition greatly reduces the complexity of UI construction.

Figure 8A:
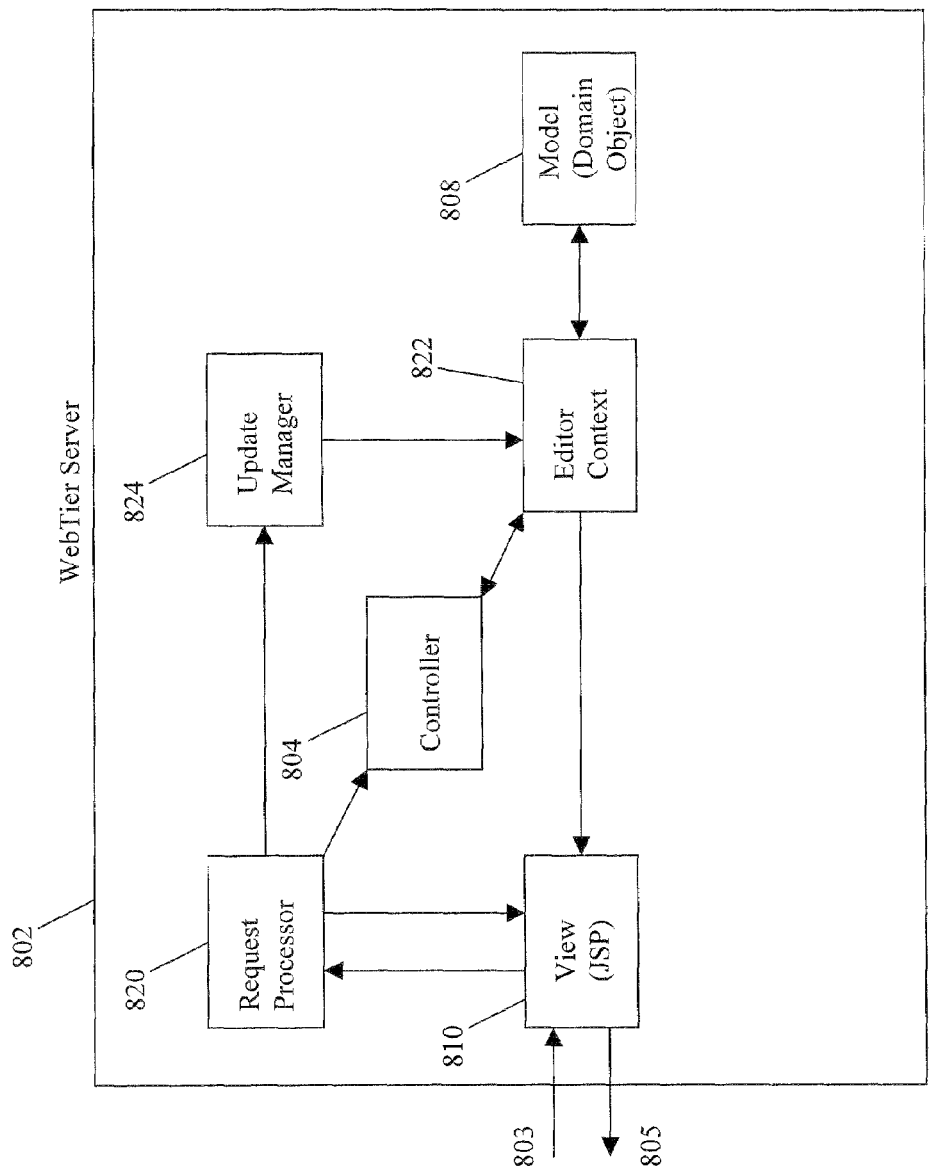
FIG. 8a shows the framework infrastructure components that interconnect the model, view and controller.

FIG. 8*a* shows the framework infrastructure components that interconnect the model 808, view 810 and controller 804. When a request 803 for a root view object (root JSP page) 810 is sent from a browser (not shown), root page 810 receives the request and passes it to a request processor 820. Request processor 820 performs at least three actions. First, it processes updates of the domain objects. Next, it processes user actions (such as a button click). Lastly, it causes the root JSP page to render the UI, i.e. generate the HTML, JavaScript, etc., that forms the web page to be sent to the browser.

However, when root JSP page 810 receives an initial request 803 and passes it to request processor 820, there will not be any updates or user actions to process. Therefore, request processor 820 just causes root JSP page 810 to render the UT. When root JSP page 810 renders, an Editor Context 822 corresponding to root page 810 is instantiated, along with the domain object 808 that the root page edits. Editor Context 822 holds the state (properties) of domain object 808, along with other properties in the Extra Properties Map (not shown). Root JSP 810 generates the root view UT (i.e., root editor panel) by rendering each control that was specified in the root page and associating a unique ID with the control. The unique ID identifies the corresponding Editor Context 822 (meaning it also identifies the object) and the property of object 808 that the control is linked to (i.e., which property it edits). For each control, the root JSP page 810 retrieves the value of the linked property from Editor Context 822, using the Editor Context's get method and inserts it in the UI.

If an include (i.e., subview tag) is specified in root page 810, then root JSP page 810 calls the subview JSP page, causing it to render the subview UT (i.e., sub-editor panel). When the subview JSP page renders, an Editor Context corresponding to this subview page is instantiated, and is associated with the domain object (sub-object) that the subview page edits. Editor Context 822 holds the state (properties) of sub-object, along with other properties in the Extra Properties Map. The subview JSP generates the subview UT (i.e., subview editor panel) by rendering each control that was specified in the subview page and associating a unique ID with the control. The unique ID identifies the corresponding Editor Context (meaning it also identifies the object) and the property of the sub-object that the control is linked to (i.e., which property it edits). For each control, the value of the linked property is retrieved from the Editor Context and rendered in the UI.

This process occurs for each subview page, and the final output 805 is the composition of root view/subview editor panels, i.e. the UI.

Root JSP page 810 also passes requests 803 from the browser that contains updates and user actions to request processor 820. Such requests are received via a post, for example. In this case, updates and user actions are sent from the browser to JSP 810 as key-value pairs. For updates, the key is the unique ID of the control and the value is the new value of the property that the control edits. For user actions, the key is the ID of the Editor Context corresponding to the editor panel in which the user action occurred and the value is the name of the method that is to be invoked on the controller in response to the user's action.

After request processor 820 receives the request from JSP 810, it processes object updates by sending the key-value pairs for the updates to update manager 824. For each update, update manager 824 uses the unique IID to determine the proper Editor Context instance 822 and then updates the property in the Editor Context with the new value. The Editor Context then updates the domain object 808 or its Extra Properties Map. If there is a validation error, the property is instead marked as invalid in context. All "selection" updates (e.g., a new user selection in a list) are performed after the updates to object properties.

After the objects are updated, request processor 820 processes user actions. For each action, request processor 820 retrieves the Editor Context 822 using the ID and calls the method on controller 804, passing it the corresponding Editor Context 822 so that the controller method can get or set whatever properties on the domain object it needs to perform its function. The controller method then translates the user action into the proper domain activity, changing the properties of the domain object 808 as needed in the Editor Context 822, which then updates the domain object.

When all of the controller methods have completed, and if there is not a redirection to a new root page, then request component calls the root page 810 again. The root page 810 and subview pages are then re-rendered following the process described above for the initial request. If there is a redirection, and there are not any validation errors, then request processor redirects to the new root page.

If a validation error occurs, the controller 804 constructs a message. The default controller implementation uses the message text from the validation exception. A validation exception is any exception listed in the configuration as such. Widgets with validation errors are rendered with a configurable visual cue.

Figure 8B:
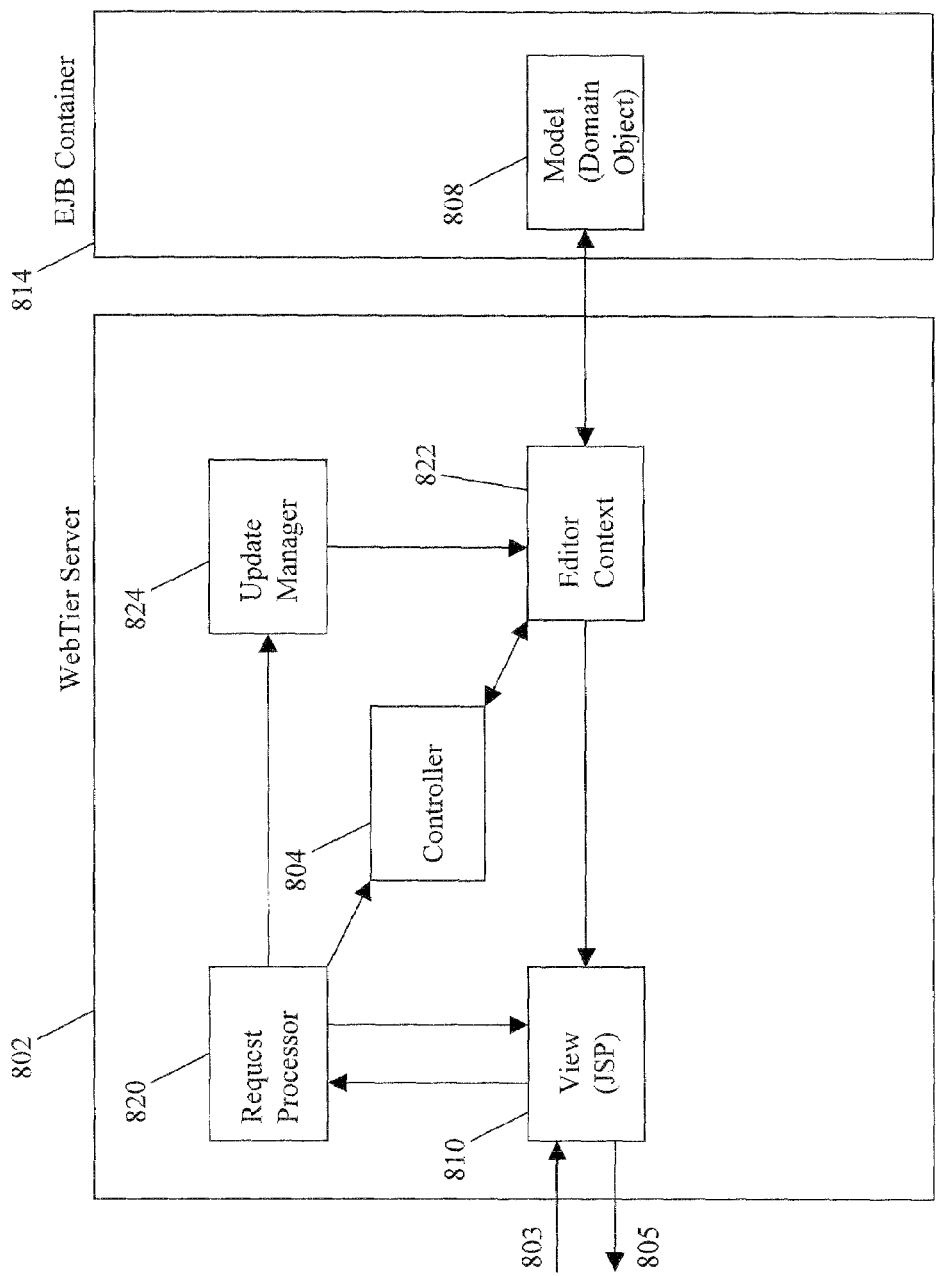
FIG. 8b shows the framework infrastructure components in an enterprise component environment.

FIG. 8*b* shows the framework infrastructure components in an enterprise component environment. In this environment the model 808 is Enterprise Java Beans (Es) in an EJB container 814. EJB container 814 may be running on the same machine as server 802, or on a separate machine.

At times a programmer may need to have an object editor set or get properties on an object other than those that are considered "its object," that is, the one(s) it primarily edits. For instance, a programmer has an object editor that edits a city, but the editor also needs to access user preferences. Normally, it does not make sense to save user preferences in the city object, so the editor will need to access a user preferences object that can get user preferences out of the session. One embodiment of framework 612 allows a programmer to do so by enabling "extensible property spaces." Extensible property spaces allow a tag in an object editor to be mapped to a property of an object other than the one that the editor edits. Namespaces are mapped in a configuration file to a class that is loaded at startup. The programmer can then designate a namespace object other than the Editor Context that is asked to get or set a property on the object.

When framework 612 is implemented as a tag library as described above, the programmer can designate the namespace via the property attribute in a tag. The programmer designates the namespace using a syntax of "namespace:property". Thus, for example, for a textfield control that maps to the property "backgroundColor" in the "userPreferences" namespace, the tag would look like: <mvc:textfield property="userPreferences:backgroundColor"/>. A userPreferences namespace object would then be asked to get or set the backgroundColor property on the userPreferences object.

It is also preferable to provide the ability to define a short form that designates the namespace. One manner of providing a short form is to use start and stop tokens that wrap the property. For instance <mvc:textfield property="userPreferences:backgroundColor"/> would be the same as <mvc:textfield property="{BackgroundColor}"/>. That is, the {} indicate the userPreferences namespace. The following is an exemplary configuration file for extensible property spaces:

| Alias | Class | Start Token | Stop Token |
|---|---|---|---|
| Editor | Editor Context | "" | "" |
| userPreferences | User Preferences | "{" | "}" |
| literal | Literal | "(" | ")" |

For the above exemplary configuration file, to access properties in the userPreferences namespace, a programmer would use "userPreferences:property" or "{property}"; for the literal namespace, a programmer would use "literal: property" or "(property)"; and for the Editor Context, a programmer would use "editor:property" or "property". As described above, the namespace of the object being edited is the Editor Context. Therefore, by default, the namespace is preferably the Editor Context and no "namespace" needs to be indicated for the Editor Context.

Also, it is often desirable to use the framework with domain models built on different underlying technologies (e.g., RDBMS, Hash Tables, Object Oriented (OO) databases, etc.). Framework 612 preferably separates the model accessing from the Editor Context to implement "pluggable" object access. Instead of the Editor Context setting or getting object properties itself, it calls set and get methods on a model accessor object that handles all of the transaction issues and methodologies needed to actually set or get the data of the model. That is, a RDBMS model accessor handles accessing a RDBMS (for example, forms the correct SQL queries), while an OO database model accessor handles accessing an OO database. In this way, different model accessors can be "plugged in" according to what the domain model is built on.

Figure 9A:
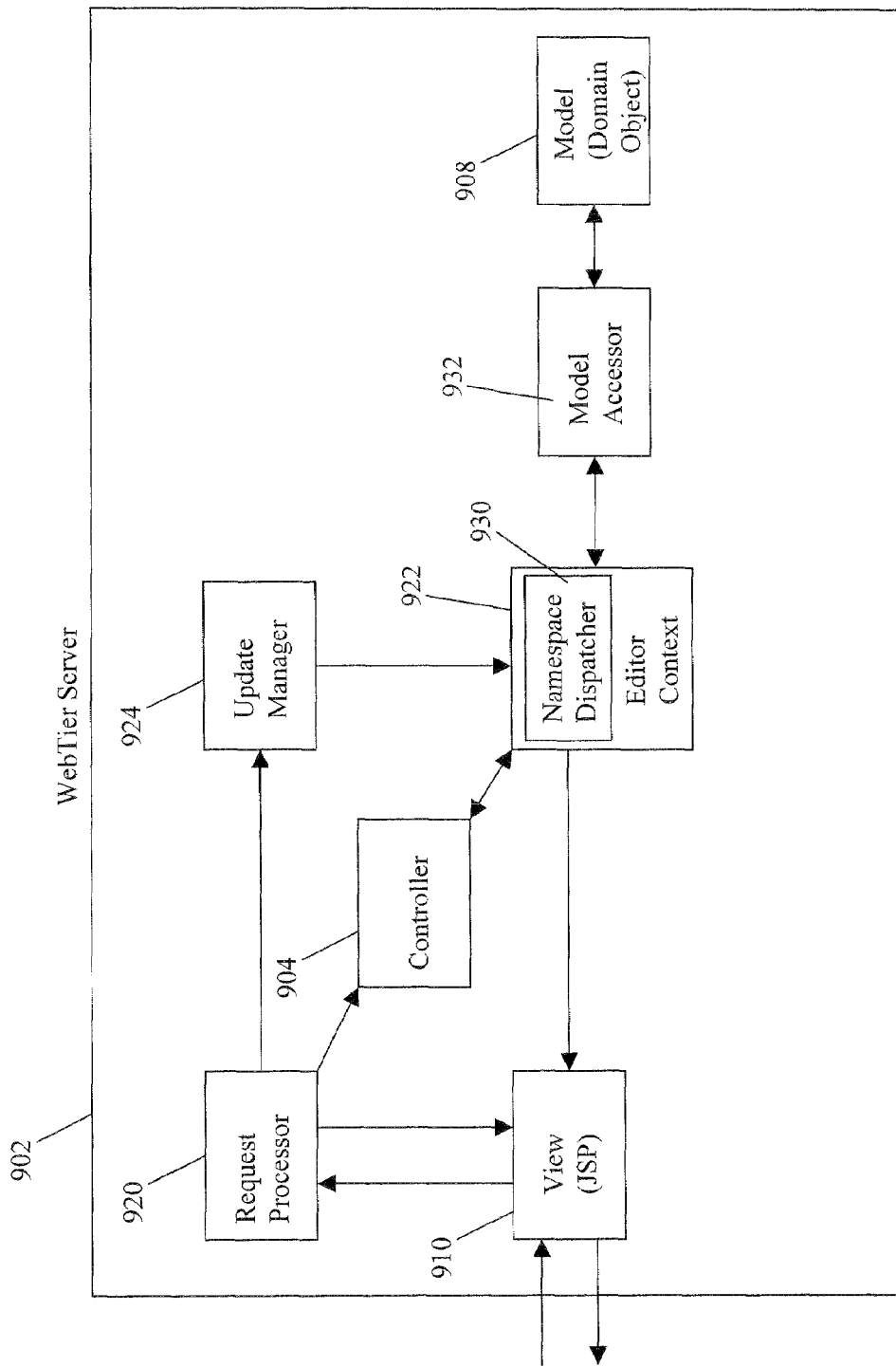
FIG. 9a shows an embodiment of the framework infrastructure components with the additional components to implement extensible namespaces and "pluggable" object access.

FIG. 9a shows an embodiment of the framework infrastructure components with the additional components to implement extensible namespaces and "pluggable" object access. The additional components comprise a namespace dispatcher 930 and model accessor 932. The embodiment of FIG. 9a operates substantially the same as the embodiment of FIG. 8a, except that namespace dispatcher 930 dispatches a set or get call on Editor Context 922 to the correct namespace, and changes by Editor Context 922 to the underlying domain object 908 are made via model accessor 932.

Editor Context 922 still implements an API having set and get methods. However, instead of "property" being passed to Editor Context 922, "namespace:property" is passed. That is, the Editor Context's public API is: set(namespace:property, data) and get(namespace:property). Namespace dispatcher 930 intercepts calls to the Editor Context's set or get methods, and determines the desired namespace from the "namespace" portion. It then calls an instance of the class that corresponds to the namespace and passes it the property, the current Editor Context, and the data, if any. When the namespace is the Editor Context, the set or get is called on Editor Context 922.

Editor Context 922 updates the domain object using the model accessor's set and get methods. The model accessors set and get methods are: set(target, property, data) and get(target, property). Target is the object that is being edited, property is a string that is the name of the property of the object being set or get, and data is the value the property is being set to. When the model accessors set or get methods are called, it handles updating and retrieving information from the underlying object based on what technology the domain model is built on.

Figure 9B:
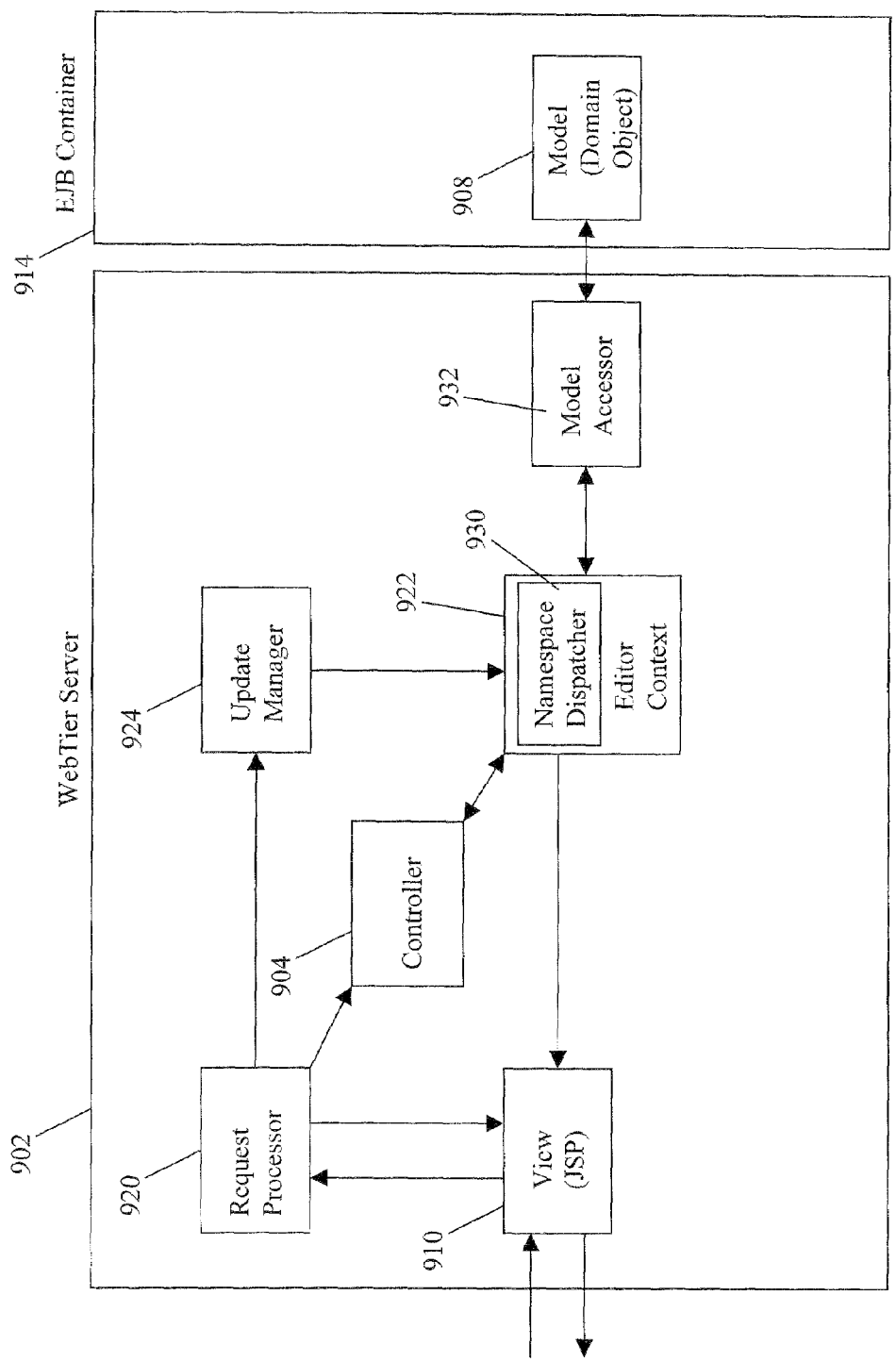
FIG. 9b shows an embodiment of the framework infrastructure components with the additional components to implement extensible namespaces and "pluggable" object access in an enterprise component environment.

FIG. 9b shows an embodiment of the framework infrastructure components with the additional components to implement extensible namespaces and "pluggable" object access in an enterprise component environment. In this environment, the model 908 is Enterprise Java-Beans (EJB) in an EJB container 914. EJB container 914 may be running on the same machine as server 902, or on a separate machine. In this embodiment, it is preferred that the model accessor logs each object change and performs changes on the EJBs as a single batch change. For instance, when a request with updates is received, all of the updates are performed and logged in the model accessor. The page is then re-rendered. During rendering, any properties retrieved are supplied by the model accessor from its list of changes. After the page is re-rendered, the model accessor batches up the changes and performs the updates on the EJBs in a single network call. This is preferred because it increases the speed of the page processing.

As described above, framework 612 enables a programmer in constructing user interfaces out of object editors that edit underlying business objects. It is common for object models to contain objects that themselves refer to collections of sub-objects. These associations are "one-to-many" relationships. It is also common to have a domain that "fans out" in terms of instances being composed of parts that themselves have parts, to arbitrary depth. This is true in terms of physical entities such as cars and airplanes. It is also true of conceptual entities. In a school, the school day is composed of periods, the periods contain classes, the classes contain students, the students have an academic history, an academic history is a collection of history elements, etc.

Also, something that is common in many user interfaces is the use of "common" or "global" lists. Examples are: the 50 states, vendor types, shipping methods, country codes, priority levels, and the like. There are significant benefits to having users selecting from lists rather than having to type values. For instance, values that are typed in by the user need to be validated, whereas choices from a list do not have to be. Also, the cognitive overhead of having to think about what to type will distract the user from the goal at hand. Selection of a value from a drop down list box is a simpler cognitive task.

While it is tempting to maintain collections of numbers or Strings, experience has shown that global lists are best represented as collections of objects. By maintaining collections as objects, and striving to keep the model in charge of the things that are considered the "legal values" for its properties, the application code is more maintainable for the system developer.

Thus, it is beneficial for framework 612 to enable programmers to create user interfaces that can add, remove, view and edit objects in a collection of objects by allowing a programmer to create controls that edit an object property that is itself a collection of objects. When framework 612 is packaged as a tag library, there are "collection" tags to create such controls. Some exemplary collection tags include tags for list boxes, choice boxes, and radio buttons. By using such collection tags, and delegating to the model to get the list of "legal values" for any property that is a collection, a programmer can develop more maintainable systems with framework 612.

The following is an exemplary application demonstrating the use of the collection type of tags and the delegation of the list of legal values for a property to the model. The application is a simple contact management system. The domain object model will be an AddressBook that contains a collection of Person instances, each of which contains an instance of an Address. Each Address has a state object. The user can select the state in an address from a list of states.

The following are the AddressBook, Person, and Address classes that form the domain object model:

Address Book:

```java
package addressbook;
import java.util.*;
public class AddressBook {
    protected Vector contacts;
public AddressBook() {
    super();
}
public void addToContacts(Person aPerson) {
    getContacts().add(aPerson);
}
public Vector getContacts() {
    if (contacts == null) setContacts(new Vector());
    return contacts;
}
public void removeFromContacts(Person aPerson) {
    getContacts().remove(aPerson);
}
public void setContacts(Vector newContacts) {
    contacts = newContacts;
}
}
```

Person:

```java
package addressbook;
public class Person {
    protected String firstName;
    protected String lastName;
    protected String phoneNumber;
    protected Address address;
public Person() {
    super();
}
public Address getAddress() {
    if (address == null) setAddress(new Address());
    return address;
}
public String getFirstName() {
    if (firstName == null) setFirstName("");
    return firstName;
}
public String getLastName() {
    if (lastName == null) setLastName("");
    return lastName;
}
public String getPhoneNumber() {
    if (phoneNumber == null) setPhoneNumber("");
    return phoneNumber;
}
public void setAddress(Address newAddress) {
    address = newAddress;
}
public void setFirstName(String newFirstName) {
    firstName = newFirstName;
}
public void setLastName(String newLastName) {
    lastName = newLastName;
}
public void setPhoneNumber(String newPhoneNumber) {
    phoneNumber = newPhoneNumber;
}
public void print() {
    System.out.println(this);
    System.out.println("first name: " + getFirstName());
    System.out.println("last name:" + getLastName());
    System.out.println("phone number: " + getPhoneNumber());
    System.out.println("---address --");
    getAddress().print();
}
public String getPreferredEditor() {
    return "PersonView.jsp";
}
public String getShortDescription() {
    return getLastName() + ", " + getFirstName();
}
}
```

-continued

Address:

```
package addressbook;
public class Address {
    protected String line1;
    protected String line2;
    protected String city;
    protected State state;
    public Address() {
        super();
    }
    public String getCity() {
        if (city == null) setCity("");
        return city;
    }
    public void setCity(String aCity) {
        city = aCity;
    }
    public String getLine1() {
        if (line1 == null) setLine1("");
        return line1;
    }
    public void setLine1(String aLine1) {
        line1 = aLine1;
    }
    public String getLine2() {
        if (line2 == null) setLine2("");
        return line2;
    }
    public void setLine2(String line2) {
        line2 = line2;
    }
    public State getState() {
        if (state == null) setState(getDefaultState());
        return state;
    }
    public void setState(State aState) {
        state = aState;
    }
    public void print() {
        System.out.println(this);
        System.out.println("line1: " + getLine1());
        System.out.println("line2: " + getLine2());
        System.out.println("city: " + getCity());
        System.out.println("state: " + getState());
    }
    public Vector getValidStates() {
        return State.getAllAmericans();
    }
    protected State getDefaultState() {
        return (State)getValidStates().get(0);
    }
}
public String getPreferredEditor() {
    return "AddressView.jsp";
}
}
```

State:

```
package addressbook;
import java.util.*;
public class State {
    protected String id;
    protected String description;
    protected static Vector allAmericans;
    public State(String anId, String aDescription) {
        super();
        setId(anId);
        setDescription(aDescription);
    }
    public static Vector getAllAmericans() {
        if (allAmericans == null) setAllAmericans(getDefaultAllAmericans());
        return allAmericans;
    }
    protected static Vector getDefaultAllAmericans() {
        Vector theStates = new Vector();
        theStates.add(new State("AL", "Alabama"));
        theStates.add(new State("AS", "Alaska"));
        theStates.add(new State("AR", "Arizona"));
        theStates.add(new State("AK", "Arkansas"));
```

```
        theStates.add(new State("CA", "California"));
        theStates.add(new State("CO", "Colorado"));
        theStates.add(new State("CT", "Connecticut"));
        theStates.add(new State("DE", "Delaware"));
        theStates.add(new State("FL", "Florida"));
        theStates.add(new State("GA", "Georgia"));
        return theStates;
    }
    protected static void setAllAmericans(Vector theAmericans) {
        allAmericans = theAmericans;
    }
    public String getDescription() {
        return description;
    }
    protected void setDescription(String description) {
        description = description;
    }
    public String getId() {
        return id;
    }
    protected void setId(String id) {
        id = id;
    }
}
```

The following are the methods on the controller, MyController:

```
public Object getDefaultAddressBook() {
    return new AddressBook();
}
public void addToContacts(EditorContext aContext) {
    AddressBook aBook = (AddressBook)aContext.getModel();
    Person aPerson = new Person();
    aPerson.setFirstName("new person");
    aBook.addToContacts(aPerson);
    aContext.set("selectedContact", aPerson);
}
public void removefromContacts(EditorContext aContext) {
    AddressBook aBook = (AddressBook)aContext.getModel();
    Object anObject = aContext.get("selectedContact");
    if (anObject == null) return;
    aBook.removeFromContacts((Person)anObject);
}
public void printPerson(EditorContext aContext) {
    Person aPerson = (Person)aContext.getModel();
    aPerson.print();
}
public void printAddress(EditorContext aContext) {
    Address anAddress = (Address)aContext.getModel();
    anAddress.print();
}
```

The following are the views, AddressBookView.jsp, PersonView.jsp, AddressView.jsp:

```
AddressBookView.jsp:

<%@ taglib uri="dss-taglib" prefix="mvc" %>
<mvc:editor model="getDefaultAddressBook"
controller="addressbook.MyController">
    <table>
        <tr>
            <td valign="top">
                <table>
                    <tr>
                        <td>
<mvc:list collectionProperty="contacts" selectionProperty="selectedContact"
displayProperty="shortDescription"/>
                        </td>
                    </tr>
                    <tr>
                        <td nowrap>
                            <mvc:button label="add contact"
action="addToContacts"/>
                            <mvc:button label="remove"
action="removeFromContacts"/><br>
                        </td>
                    </tr>
                </table>
            </td>
            <td valign="top"><mvc:subview property="selectedContact"
```

```
-continued viewProperty="preferredEditor"/></td>
        </tr>
    </table>
</mvc:editor>
```
PersonView.jsp:

```
<%@ taglib uri="dss-taglib" prefix="mvc" %>
<mvc:editor model="getDefaultPerson" controller="addressbook.MyController">
    <table>
        <tr>
            <td>first name</td>
            <td><mvc:textfield property="firstName"/></td>
        </tr>
        <tr>
            <td>last name</td>
            <td><mvc:textfield property"lastName"/></td>
        </tr>
        <tr>
            <td>phone number</td>
            <td><mvc:textfield property="phoneNumber"/></td>
        </tr>
        <tr>
            <td>address</td>
            <td><mvc:subview property"address"
view="getPreferredEditor"/></td>
        </tr>
    </table>
    <mvc:button action="submit" label="submit"/>
    <mvc:button action="printPerson" label="print"/>
<mvc:button action="toggleDebug" label="debug"/>
</mvc:editor>
```
AddressView.jsp:

```
<%@ taglib uri="dss-taglib" prefix="mvc" %>
<mvc:editor model="getDefaultAddress" controller="addressbook.MyController">
    <table>
        <tr>
            <td>line one</td>
            <td><mvc:textfield property="line1"/></td>
        </tr>
        <tr>
            <td>line two</td>
            <td><mvc:textfield property="line2"/></td>
        </tr>
        <tr>
            <td>city</td>
            <td><mvc:textfield property="city"/></td>
        </tr>
        <tr>
            <td>state</td>
            <td<mvc:choice selectionProperty="state"
    collectionProperty="validStates" displayProperty="description"/></td>
        </tr>
    </table>
    <mvc:button action="submit" label="submit"/>
</mvc:editor>
```

AddressBookView.jsp uses a "collection" tag, <mvc:list> to show the collection of people in the address book. A collection tag produces a collection control, in this case, a list box. The collection that is used to populate the list box is specified with the attribute "collectionProperty." The value of "collectionProperty" is "contacts" because the model for the page is an AddressBook and AddressBook has a collection property called "contacts."

A list box generally has an item selected. The "selectionProperty," in this case, selectedContact, contains the current selection. Notice that "selectedContact" is referenced in the subview tag also. This is how PersonView.jsp is designated to display and edit the selected object. The selectionProperty attribute provides a declarative way of expressing the inter-relationship between views.

Note that "selectedContact" does not actually exist in the model of this view, AddressBook. Framework 612 creates a field in the Editor Context (in the Extra Properties Map) to hold onto this data for the lifetime of the session. In this case, the selection indicates the state of the user interface, and has no significance to the underlying domain objects. That is why it is stored only in the Editor Context.

"Contacts" is a property that is a collection of objects. To convert that to a collection of Strings for display in the browser, the "displayProperty" is applied, in this case "shortDescription."

It should be noted that when a JSP page renders a collection control, it creates the web page in such a way that an update is performed when the selection in a collection control is changed (for example, by including JavaScript that sends a request to the root JSP page whenever the selection is changed).

List is completely interchangeable with "choice" or "radioButtonGroup." As shown, AddressView.jsp uses an <mvc:choice> collection tag to show the collection of states in the address. In this case, however, the list of valid states displayed is delegated to the model via the Address's validStates property, which is a collection of states that is populated based on some function. Setting the "collection-Property" attribute value equal to "validStates" causes the choice box to be populated based on the getValidStates function of Address, thus, delegating the items in the list to the domain model. Note, that "selectionProperty" is set to "state," which is maintained by the model, unlike the "selectedContacts" in AddressBookView.jsp.

Figure 10A:
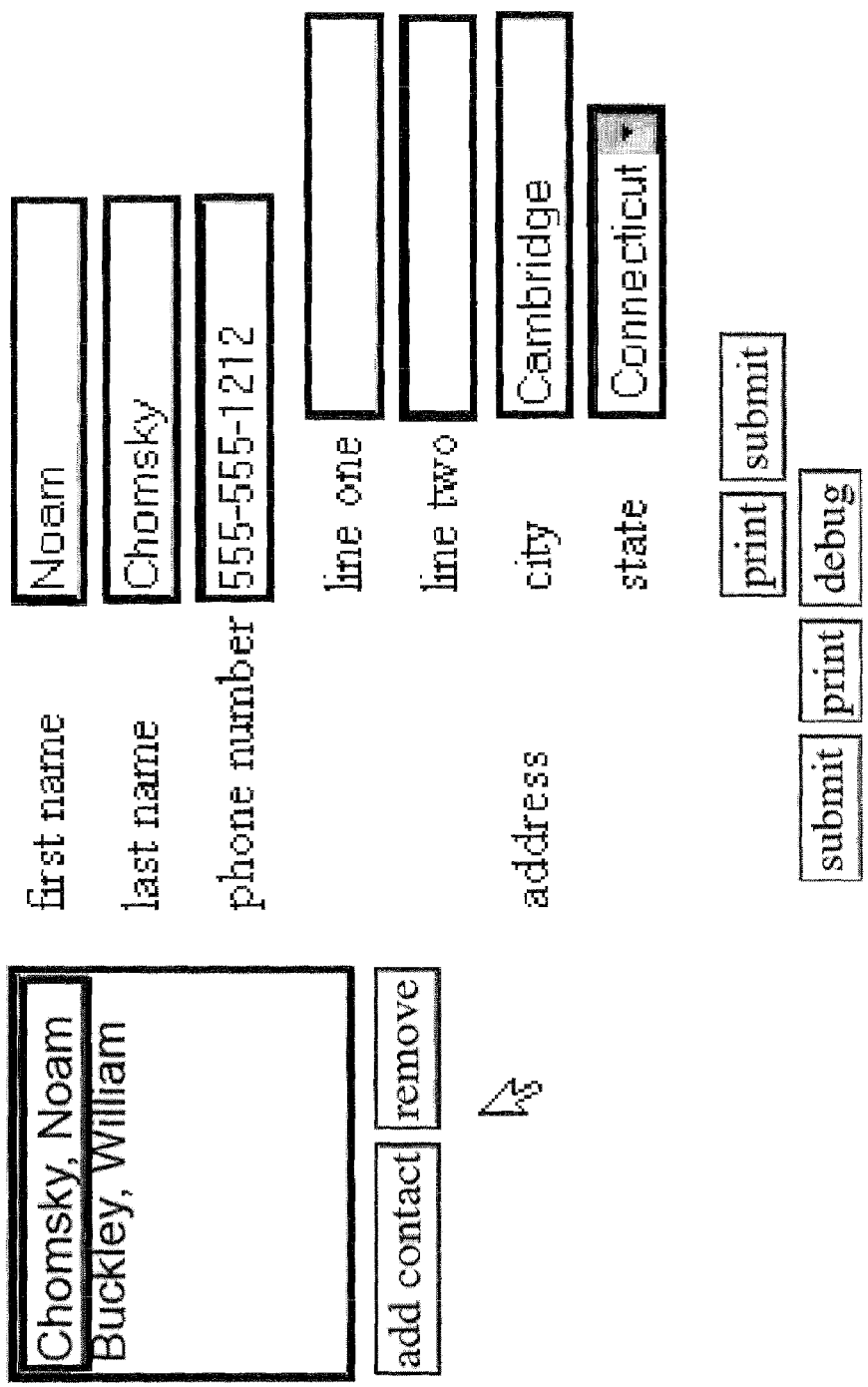
FIG. 10a illustrates the interface for the exemplary contact management system when debugging is turned off.

It is also beneficial to provide programmers with debug support in framework 612. One debug support feature entails "decorating" the various editor panels to display the composite nature of the user interface. To provide this support, framework 612 comprises a "toggleDebug" method on MyController. The "toggleDebug" method lives in the Controller class and turns debug mode on and off. In the above example, AddressBookView.jsp has a "debug" button that invokes the "toggleDebug" method. FIG. 10*a* illustrates the interface for the contact management system when debugging is turned off, while FIG. 10*b* illustrates exemplary decorations to identify the parameter and names of the various editor panels when debugging is turned on. In the exemplary decorations, red borders with the file name in white are placed around each editor panel. Another debug support feature allows a programmer to view and edit the underlying JSP or object by clicking on the name of the page in the outlined editor panel. Another beneficial debug support feature allows a programmer to see the subview load and rendering times.

At times, the state of UI widgets (e.g., widget disabled/enabled, visible/invisible, read-only, special appearance, etc.) can be best thought of as depending on the relevance of the widget in the present context. For example, there may be a property on a person object for that person's occupation. However, it may not make sense for an infant to have an occupation (and, consequently, an occupation widget to edit the occupation property). Therefore, in the particular context of a small child, the occupation widget should perhaps not be displayed (i.e., is invisible).

Thus, in one embodiment of the present invention, the software developer is given an easy way to adapt a domain message (e.g., "isEmployable") to UI behavior (enablement or visibility, etc.) and in this way allowing the domain object to control the user interface without being contaminated by knowledge of it. The state of the widget is changed based on this information obtained regularly from the domain object. To continue the example above, the UI would know that if the child is old enough to have an occupation, then the occupation widget is enabled and visible. If not, then it is invisible (and consequently disabled). Thus, framework 612 provides a mechanism for the control to "ask" the domain object the present context to thereby determine what state widgets should be in. In one embodiment, this is accomplished by a "block" tag. The block tag allows controls to be grouped and their state to be determined by the present context. For the example above, the use of the block tag might look like:

```
<mvc:block visibleProperty = "isEmployable">
    <mvc:textfield property="occupation"/>
</mvc:block>
```

Thus, the person object would determine if the person is employable (in this case, for instance, a method in the person object might determine if the person was over 14) and if so, indicate that they are. Otherwise it would indicate that the person is not employable. If the person was employable, the "occupation" textfield would be enabled and visible, otherwise it would not be visible. While a tag for grouping widget tags together is useful, other mechanisms could be used. For instance, the enableProperty and visibleProperty could be attributes of the widget tags themselves or be used to set variables in page scope or other scopes which then controls these properties indirectly.

Also, for some systems it is advantageous to provide updates to displayed values whenever the underlying domain object changes, without doing a page refresh. Such a "live update" capability is important for control systems, trading systems, etc. Thus, framework 612 preferably comprises a live update component that can update values without performing a page refresh. An attribute is provided for controls that specifies their value should be forced out to the browser using the frameworks live update. Using this attribute, when the underlying domain object takes on new value, the information will be forced out to the browser automatically, with no additional application code to write.

Figure 11:
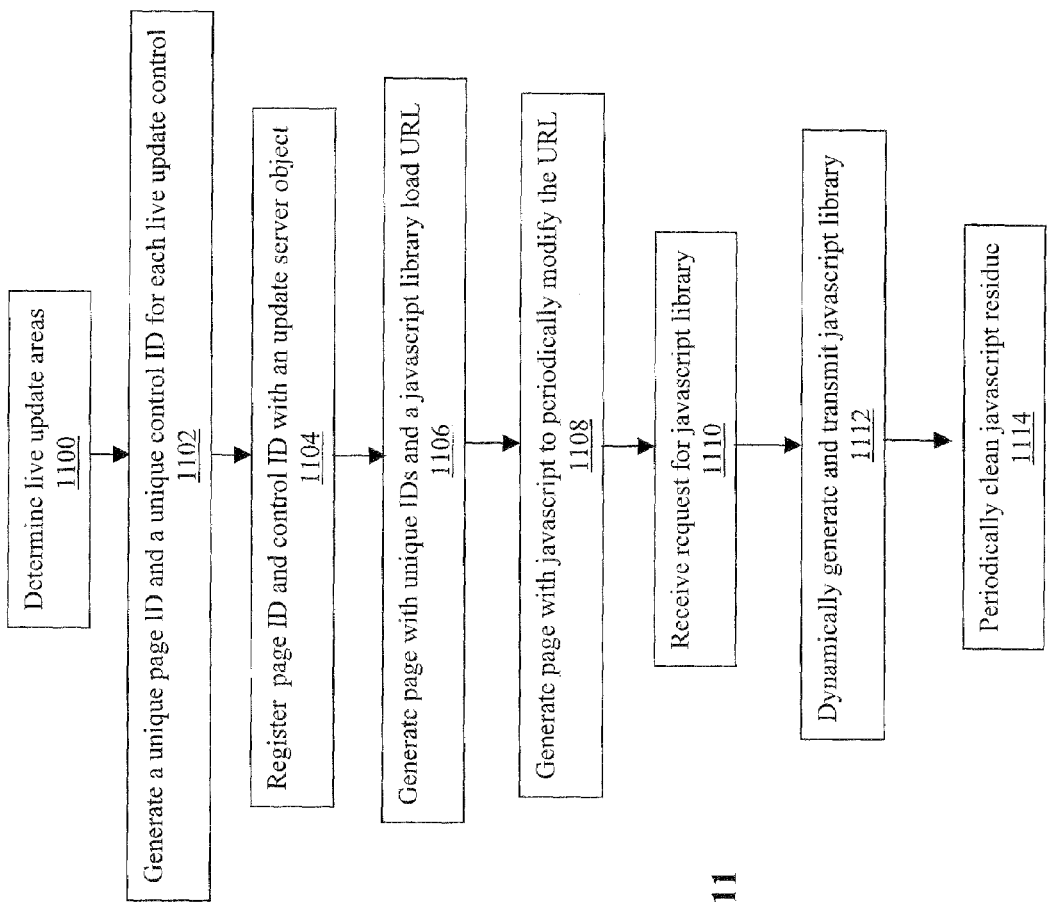
FIG. 11 illustrates the process performed to implement live updates.

FIG. 11 illustrates the process performed to implement live updates. When a JSP page generates a web page, all live update areas are determined by the live update attribute (step 1100). The generated web page is given a unique ID, and each control identified for liveupdate is given a unique ID (step 1102). The page ID and control ID are registered with an update server object, which can access the property in the domain object that the control is linked to (step 1104). The web page is generated with the unique IDs and with a JavaScript library load URL (step 1106). This URL is the location of a JavaScript library that can be downloaded to and executed by the browser. When executed by the browser, the JavaScript library modifies the web page by editing the Document Object Model (DOM) of the page in the browser's memory. The web page is also generated with JavaScript code that periodically modifies the URL in a manner that does not affect the retrieval of the JavaScript library (step 1108). For example, the time in milliseconds could be appended to the end of the URL, which the server ignores when the library is loaded. Or the entire tag could be replaced in the page, which makes it look like a new URL. This defeats the browsers caching of the JavaScript library and causes the JavaScript library to be retrieved again (step 1110).

When the JavaScript library is retrieved, the page ID and control IDs are sent to the server and the JavaScript library is dynamically generated to edit the DOM of the web page so that the values displayed in the controls corresponding to the control ID reflects the current values of the properties in the mode (step 1112). The JavaScript library is dynamically generated using the update server object to access the corresponding domain object. In one embodiment, the JavaScript library load URL points to a JSP page that dynamically generates the JavaScript library. The page ID and control ID are sent to the JSP page and the JSP page passes these to the update server object, which retrieves the corresponding property values from the domain objects. The update server object then passes the property values to the JSP page, which then constructs the JavaScript library. If updates are requested a significant number of times when there are no new values for that page, a static copy of the JavaScript library can be pushed out to an HTTP cache so that the origin server does not see any of the requests until a de-cache occurs. Each time a JavaScript library is retrieved, it takes up space in the browser's memory. It is, thus, beneficial to clean up any of this JavaScript residue, for example, by periodically forcing a page refresh (step 1114).

In one embodiment, all tags in framework 612 are implemented as subview tags. That is, each tag is implemented to include a corresponding JSP page that implements the function of that tag. For instance, a control tag <mvc: textfield> acts to include a control JSP page "textfield.jsp" in the root JSP, in the same way a subview tag such as <mvc:subview property="address" viewProperty="AddressView.jsp"> acts to include an AddressView.jsp. The textfield.jsp contains the appropriate JSP tags and JavaScript to implement a textfield control. Thus, when a root JSP is rendering, it renders everything by calling the corresponding JSP page, which then renders the UI widget or object editor. For example, for a textfield tag, <mvc:textfield>, the root page calls textfield.jsp, which renders the textfield control.

Implementing all tags as subview tags allows for easy creation of custom controls and control tags. By editing existing control JSP pages, or creating new control JSP pages, and modifying the TLD file, a user can create a custom control and tag. Implementing all tags as subview tags is also particularly advantageous because it allows a user to create a custom tag by converting an object editor into a custom tag. For instance, a PersonView.jsp can be converted into a tag <mvc:person> by placing the PersonView.jsp JSP page into the directory that contains control JSP pages and editing the TLD file to include a person tag that accepts attributes corresponding to the properties that PersonView.jsp edits. In addition to attributes corresponding to the properties, other attributes can also be implemented.

In one embodiment, framework 612 comprises an autotag generation tool that automatically modifies the TLD file. By indicating that a JSP page is to be converted to a custom tag (for example, by placing it in the directory that contains control JSP pages), the autotag generation tool automatically analyzes it to determine what attributes the custom tag should contain. The autotag generation tool then automatically modifies the TLD file to include the custom tag and attributes. For example, if the PersonView.jsp described above is placed in the directory, the autogeneration tool analyzes it and determines that firstName, lastName, and phoneNumber are properties that should be attributes of a person tag. The autogeneration tool then modifies the TLD file to contain a <mvc:person> tag that takes firstName, lastName, and phoneNumber as attributes.

Another embodiment of framework 612 also includes a tool for automatically creating default user interfaces by walking the domain object model tree and generating corresponding view objects. A programmer can then tailor these default UIs to the specific needs of the application. This helps with rapid prototype development.

Figure 12:
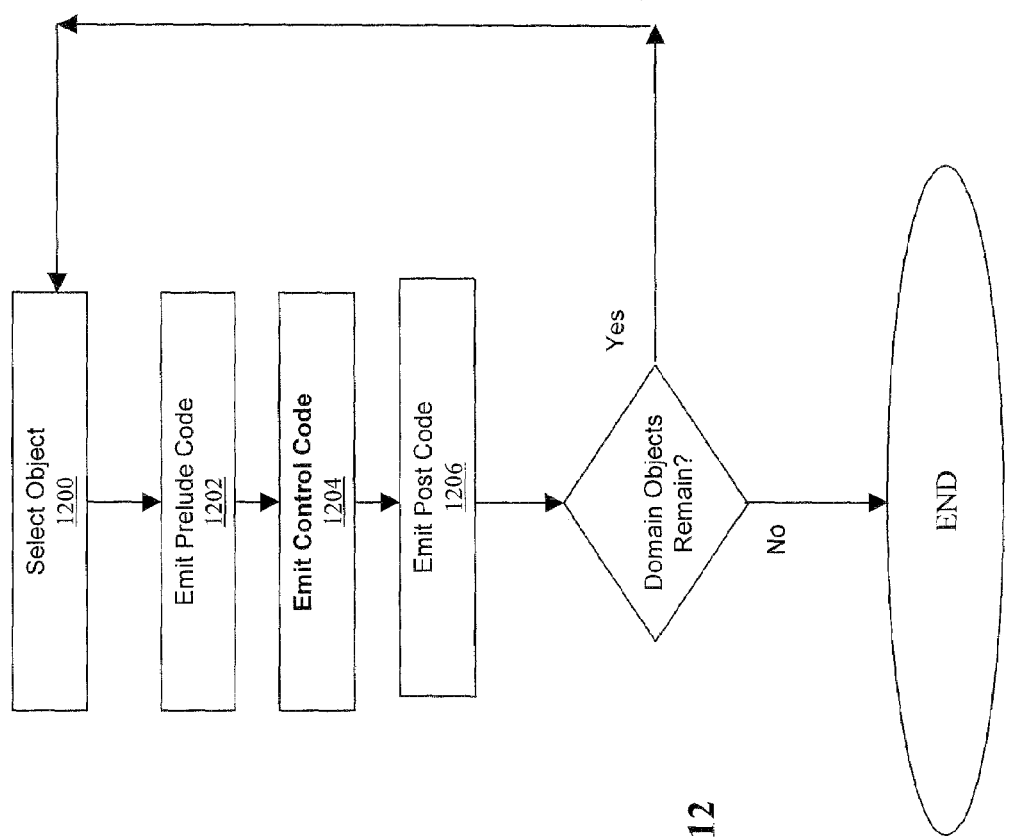
FIG. 12 illustrates the process implemented by an automatic user interface tool.

FIG. 12 illustrates the process implemented by the automatic user interface creation tool. First, a root object of the domain object model is selected (step 1200). The domain objects are provided to the automatic user interface tool in any format that describes the objects' properties. For instance, the objects can be provided as Java classes, or in a higher-level language such as XML, UML, or a pseudo language created to be used with the automatic user interface tool. Prelude code (such as an <mvc:editor> tag) is emitted (step 1202). The object is then analyzed and, for each property or object in the root object, control code (such as an <mvc:textfield> or <mvc:subview> tag) is emitted (step 1204). The appropriate control is selected by using a control selection rule set to determine the appropriate control code for the property or object. For instance, if the property is a collection of objects, the control selection rule set would indicate a list control needs to be emitted. When a user adds custom control tags, the user can modify the control selection rules so that the custom control is selected in the proper circumstances. After all control code is emitted, post code (such as an <mvc:editor> tag) is emitted (step 1206). As long as domain objects remain in the model, the next object is selected and the process is repeated.

In another embodiment, framework 612 includes an example-based model creation tool to automatically create a domain object model from example objects in the domain. The example-based program tool is a knowledge-based system that applies rules to example domain objects to make assumptions about the various items needed to create an object model, from which the tool generates well-formed class definitions. In general, to create an object model the following items need to be known:

What classes exist;
What super-classes each class has;
What attributes each class has; and
What are the types/legal values of those attributes.
At times, type converters may also need to be known to create an object model. Good assumptions about theses items can be made by looking at example data. This is especially true if:
The data is formatted according to certain conventions (e.g., level 1 tag or file names indicate class, etc., level two tag or column name indicates attribute, etc.)
The data is formatted according to well-documented standards, e.g., MathML and other XML standards.
Further, these assumptions can be refined by:
Confirming them by interaction with the user.
Asking the user to fill in all the rest of information that cannot be extracted from the example data (such as reasonable super classes).

Figure 13:
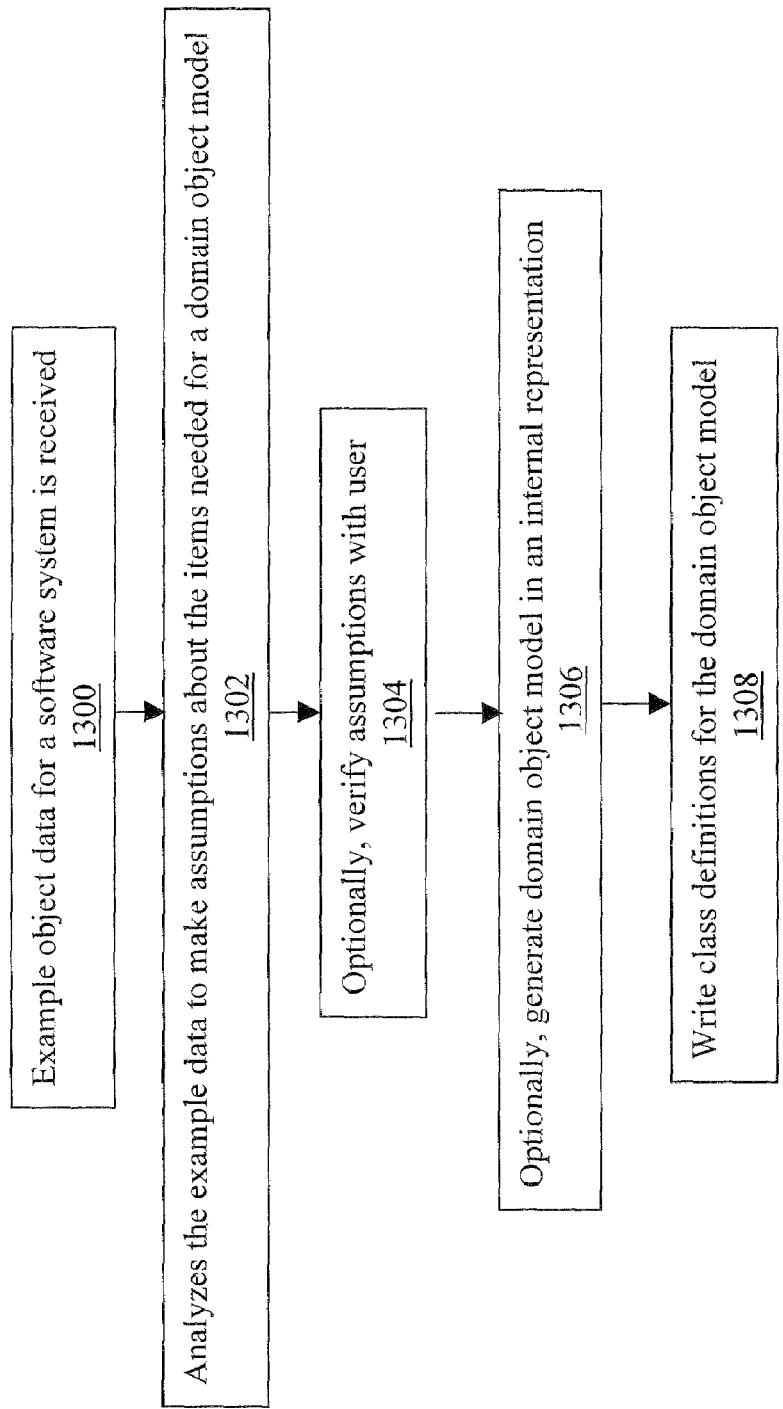
FIG. 13 illustrates the process implemented by an example-based program tool.

FIG. 13 illustrates the process implemented by the example-based program tool. Example data for a software system is received (step 1300). For instance, example objects of the system can be created in XML and then provided to the example-based program tool. The system then applies a rule set or otherwise analyzes the example objects to determine a set of assumptions about the items needed for an object model (step 1302). For example, the tool assumes that one class is Address because there is a tag named Address; Address has attribute State because there is an attribute "State" in the Address tag; the legal values for State must include NY, NJ, CN because the state attribute in different Address objects have those values; these are states of the US so the other state values can probably be added in as legal values. This analysis can be done, for example, by using a Document-Type-Definition (DTD) examination when example objects are represented in XML. Optionally, the assumptions are verified by asking the user if the assumptions are correct and, if not, what they should be (e.g., "Seems like the possible values of "Status" is "on" or "off". Is that the only two values? Can we represent this as a Boolean called "IsOn"?) (step 1304). From the original assumptions, and any correction additions made by the user, class definitions are written out for the domain object model (step 1308). Optionally, the domain object can be generated and stored in an internal representation, such as XML, UML, or a pseudo language (step 1306), and then the class definitions are written out from this internal representation (step 1308). The example objects can then be optionally stored in a database for use with the application.

It is advantageous for the example-based program tool to create classes in which instances can write themselves out into more-or-less the same format as the example objects were in originally. Thus, for example, if the example objects were in XiML with particular tag names used, the classes generated from the examples should be able to generate strings of XML with these same tags used. This is particularly advantageous for a number of reasons, including:

It is a very common requirement that objects need to be exported in some format.
   Web services are growing in importance so the ability to write objects out as XML according to some standard will be an even more common requirement in the future as it has been in the past.
   Writing out objects such that they can be read in by another program is an error-prone activity better done by a program than a human. Erroneously swapping the minutes and the seconds in a date/time object that has been written out to a file could be a very expensive as well as an easy to miss error, for example.
   If more than one system is written using this same approach, even if objects in one of them (e.g., an Accounting Package) have very different business logic than objects in the other (e.g., a Scheduling System) the two systems will likely be able to exchange information with little human coding. Such integration is of high business value.

After the domain object model has been created, the user can then edit it to refine it and to add business or other such logic to the model. Also, after an object model is created, the automatic UI generator can be used to create a default UI from object model as described above (either from the class definitions or other representation). The automatic user interface creation tool and example-based model creation tool could be implemented as a single tool that generates the object model and default user interface.

These tools allow a programmer to quickly create a domain model and default view. The user can then include business or other such logic in the domain model, or otherwise further refine it, along with creating controllers to provide for a prototype system.

Figure 14:
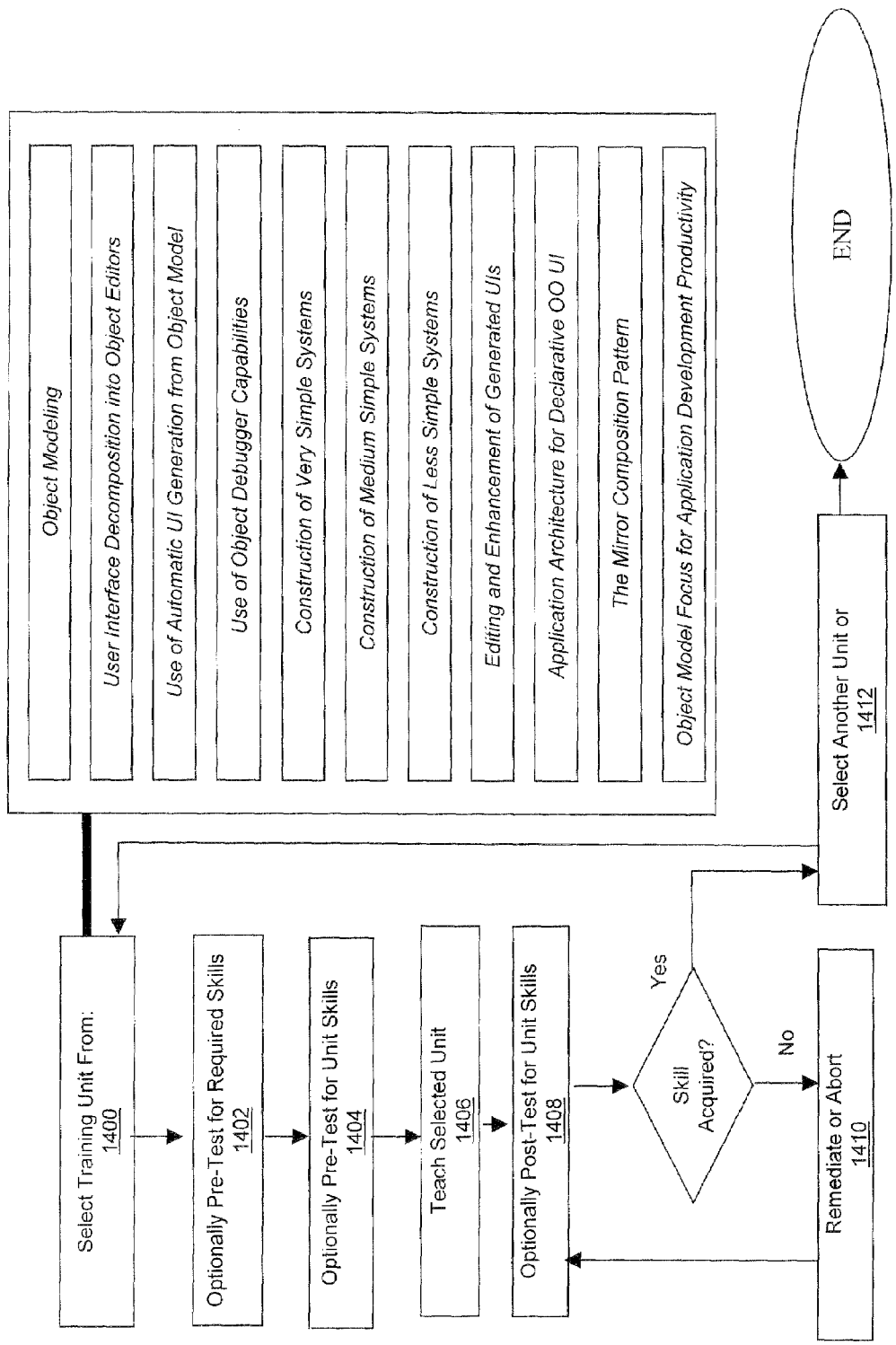
FIG. 14 illustrates a process for teaching programmers how to program using the framework.

Many programmers may need to be taught how to properly program using the framework to construct declarative user interfaces. FIG. 14 illustrates a process for teaching programmers how to program using the framework to construct declarative user interfaces. First, a training unit is selected from one of the following modules (step 1400):

Object Modeling
   Decomposition of UI into Object Editors
   Use of Automatic UI Generation Tool
   Use of Debugging Features
   Construction of Very Simple Systems
   Construction of Medium Simple Systems
   Construction of Less Simple Systems
   Editing and Enhancement of Default UIs
   Application Architecture for Declarative Object-Oriented UI
   Mirror Composition
   Object Model Focus for Application Development Productivity Optionally, the programmer is pre-tested for the required skills (step 1402) or unit skills (step 1404). The selected training unit is taught (step 1406). Optionally, the programmer is post tested for the unit skills (step 1408). If the skill is not acquired, they can be taught again or the process can be aborted (step 1410). If the skill is acquired, another unit is selected if desired (step 1412) or the process is ended (step 1414).

Figure 15:
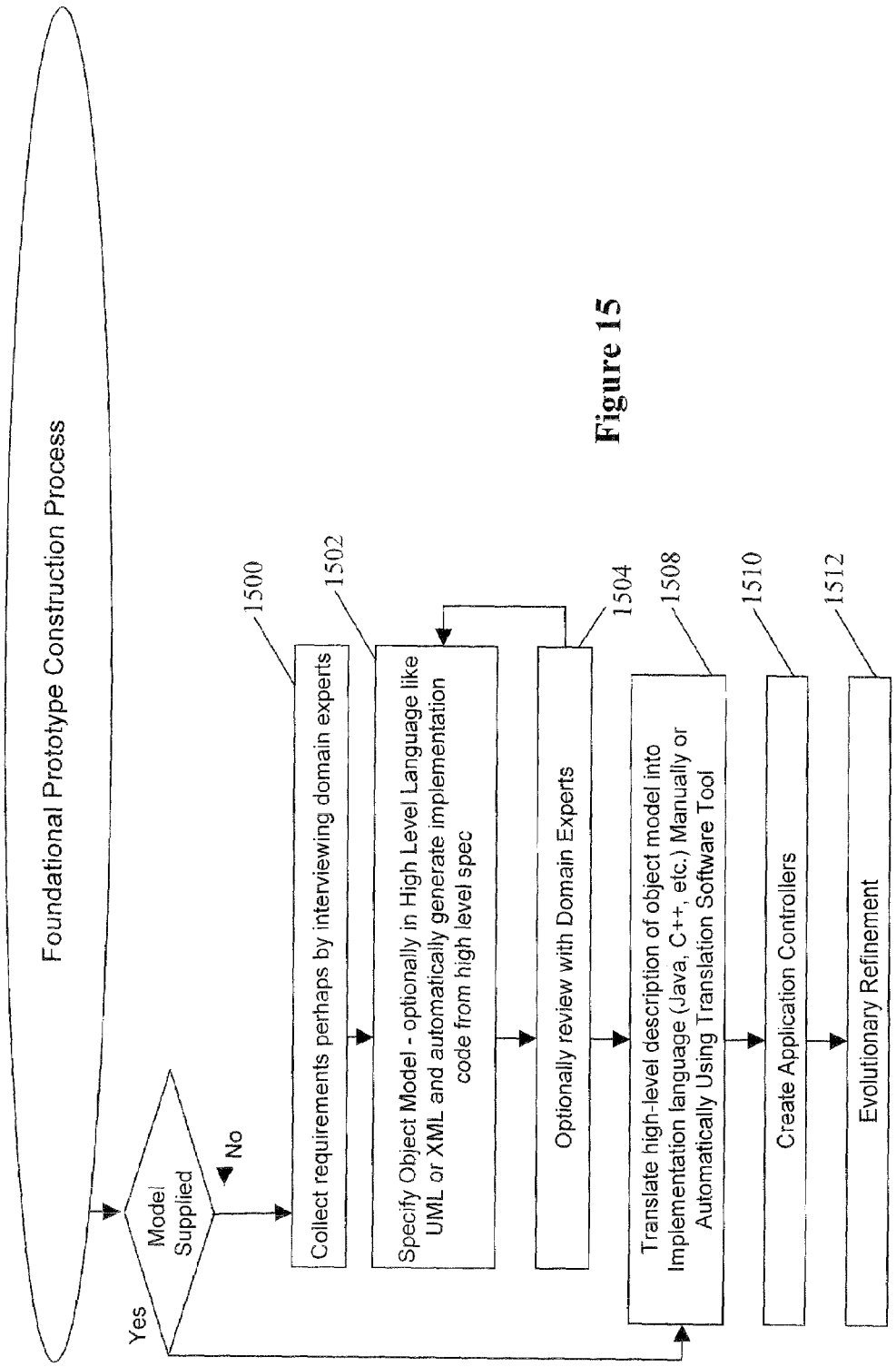
FIG. 15 illustrates the process for constructing foundational prototypes using framework according to the present invention.

FIG. 15 illustrates the process for constructing foundational prototypes using framework 612. If the domain object model is not provided, the requirements are collected, for example, by interviewing domain experts (step 1500). The object model is then specified (step 1502), optionally in a high level language such as XML or UML, and review with the domain experts (step 1504). The specified model object is then translated into implementation code (step 1508), either manually or automatically using the automatic generation tools. Application controllers are then created (step 1510) and evolutionary refinement (step 1512) of the application is performed. If the model is supplied, the model does not have to be developed and the supplied model is instead translated into the implementation language (step 1508).

Figure 16A:
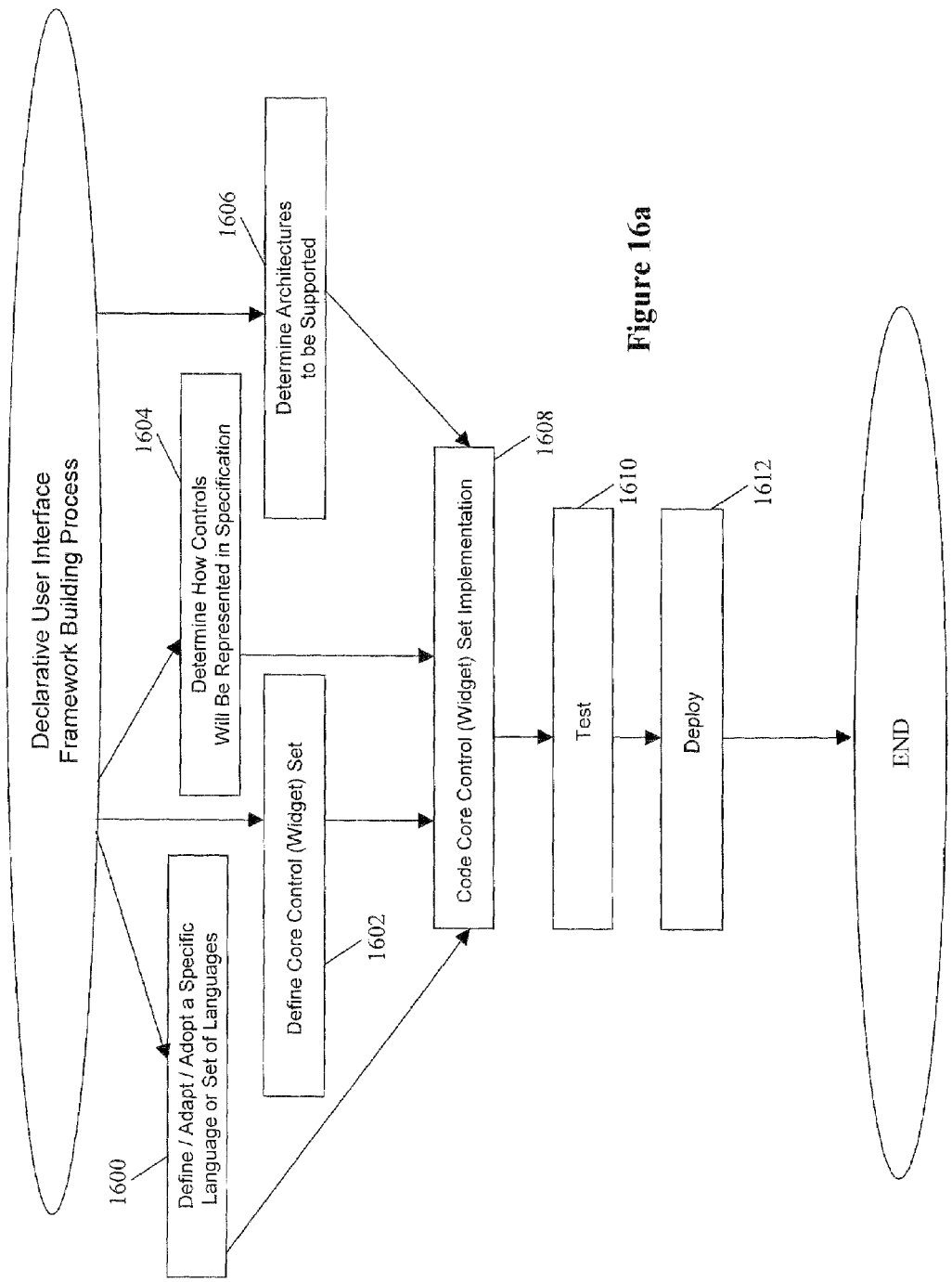
FIG. 16a illustrates the process for building a declarative using interface framework.

FIG. 16a illustrates the process for building a declarative user interface framework. A specific language or set of languages is defined, adapted, or adopted (step 1600). The core widget control set is defined (step 1602). How the widget controls will be represented in the specification is determined (step 1604). The architectures that are to be supported are determined (step 1606). The core widget control set is then coded (step 1608). The framework is tested (step 1610) and then deployed (step 1612).

Figure 16B:
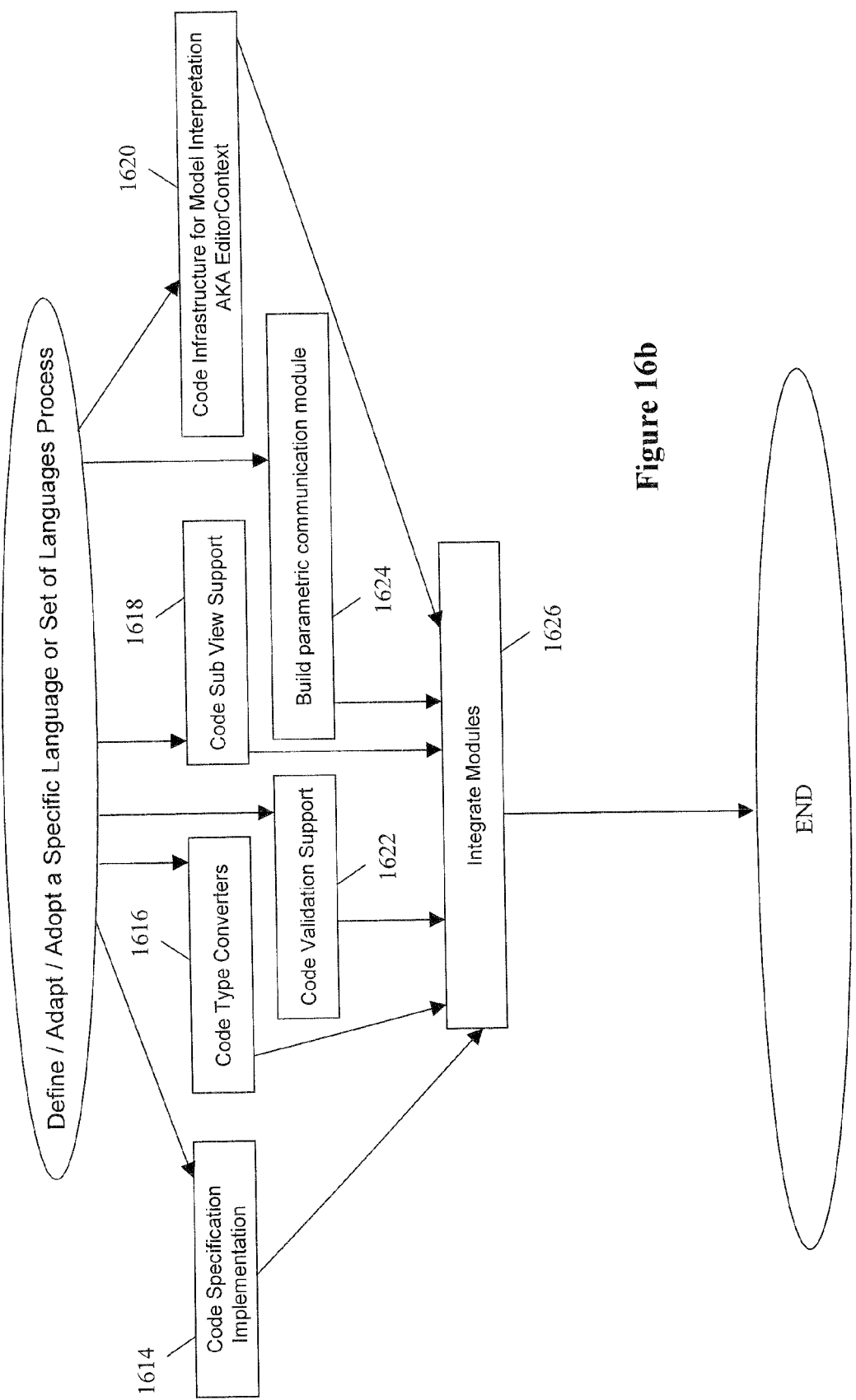
FIG. 16b illustrates the process of defining, adapting, or adopting a specific language or set of languages.

FIG. 16b illustrates the process of defining, adapting, or adopting a specific language or set of languages. The specification implementation is coded (step 1614). Type converters, subview support, and the infrastructure for the Editor Context is coded (step 1616, 1618, and 1620). Validation support is coded (step 1622). A parametric communication module for communicating parameters around the system is built (step 1624). These modules are then integrated (step 1626).

Figure 17A:
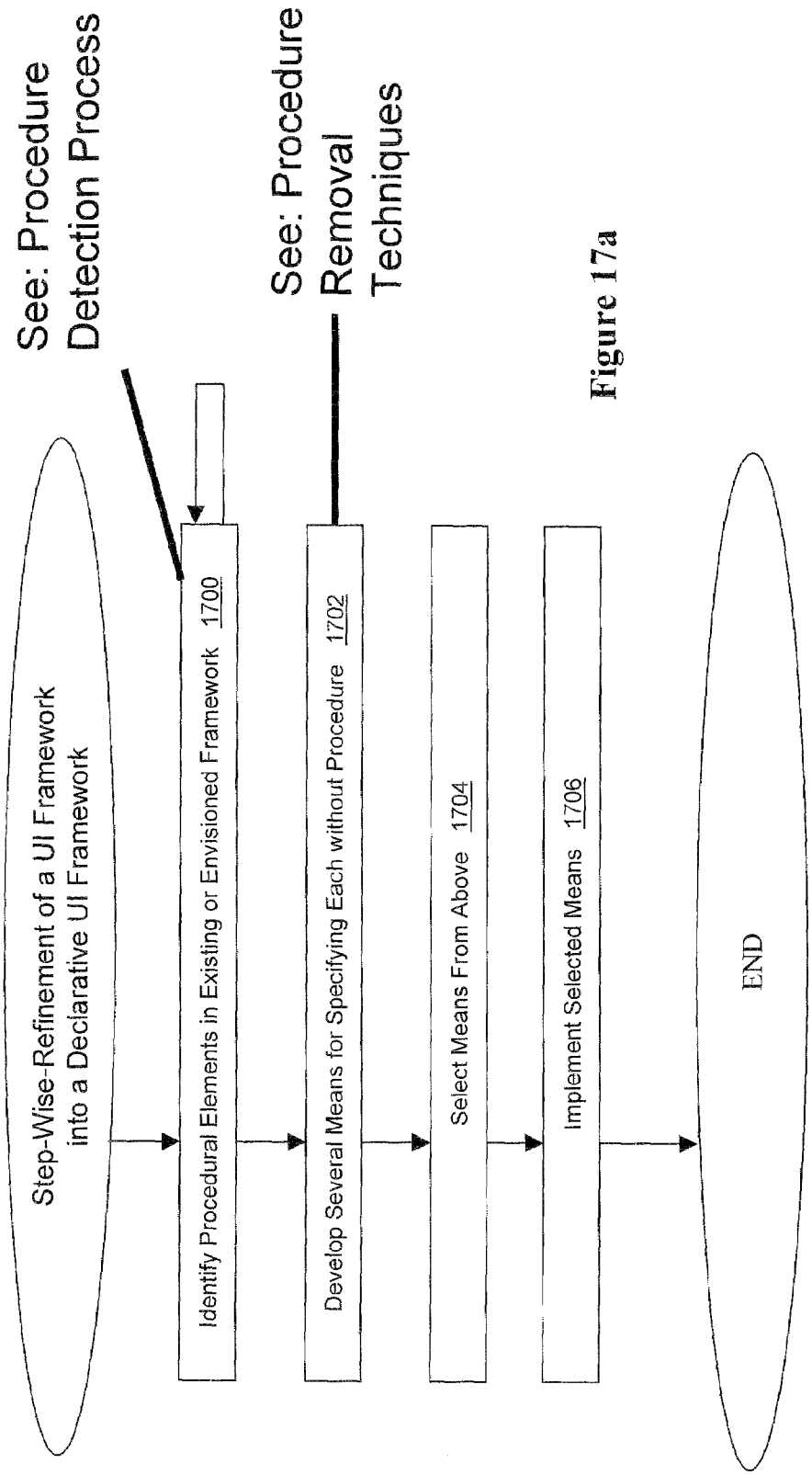
FIG. 17a illustrates a process for the step-wise refinement of a UI framework into a declarative UI framework.

FIG. 17a illustrates a process for the step-wise refinement of a UI framework into a declarative UI framework. Procedural elements in the UI framework are identified (see FIG. 17b) (step 1700). Means for specifying each procedural element without procedure is developed (see FIG. 17c) (step 1702). One of the means is selected (step 1704) and implemented (step 1706).

Figure 17B:
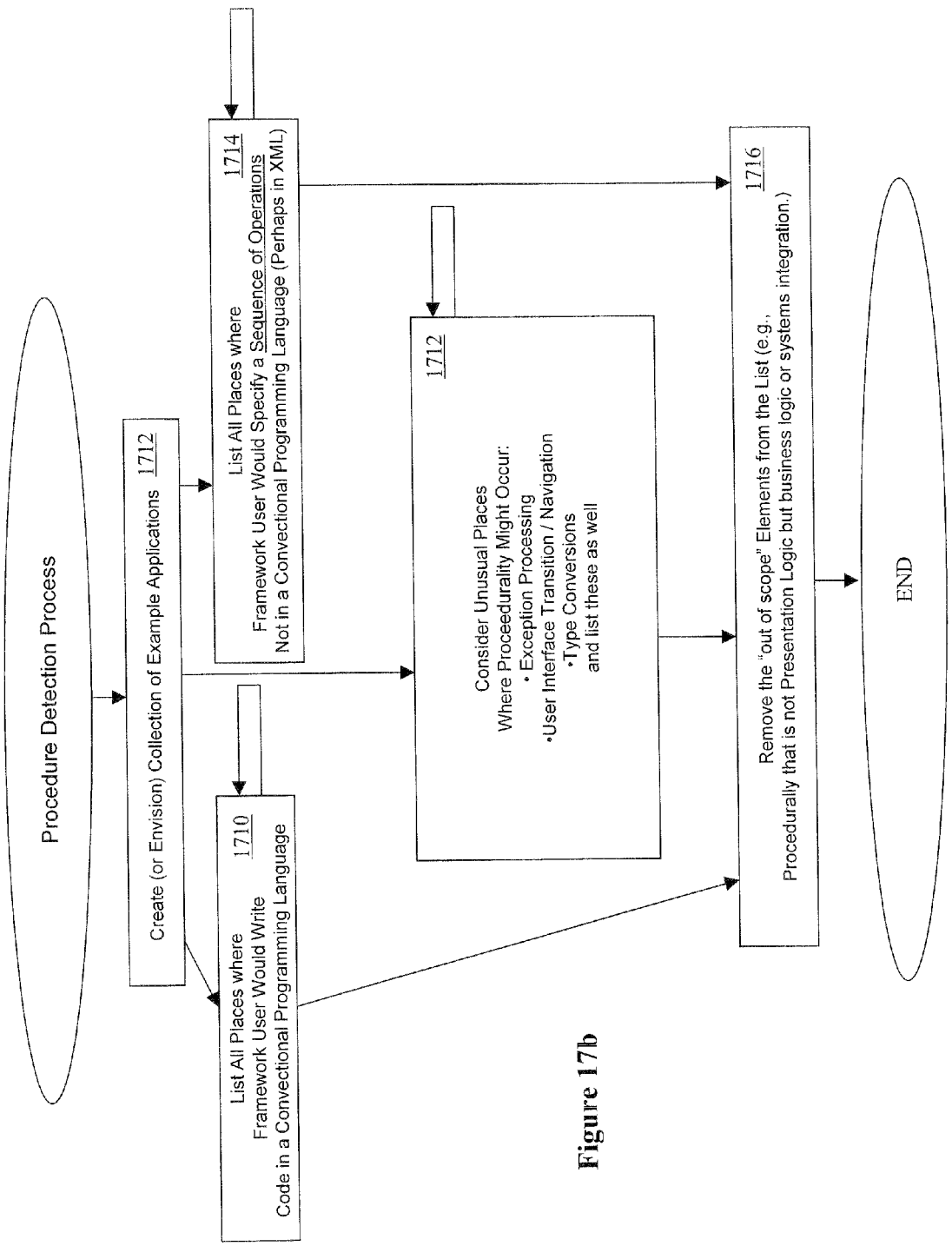
FIG. 17b illustrates a process for identifying procedural elements in a UI framework.

FIG. 17b illustrates a process for identifying procedural elements in a UI framework. Example applications are created or envisioned (step 1708). All places where framework user would write code in a conventional programming language are listed (step 1710). All places where framework user would specify a sequence of operations are listed (step 1714). Unusual places where proceeduality may occur are considered (step 1712). "Out of scope" elements are removed from the list (e.g., proceedurality that is not presentation logic but is business logic or systems integration) (step 1716).

Figure 17C:
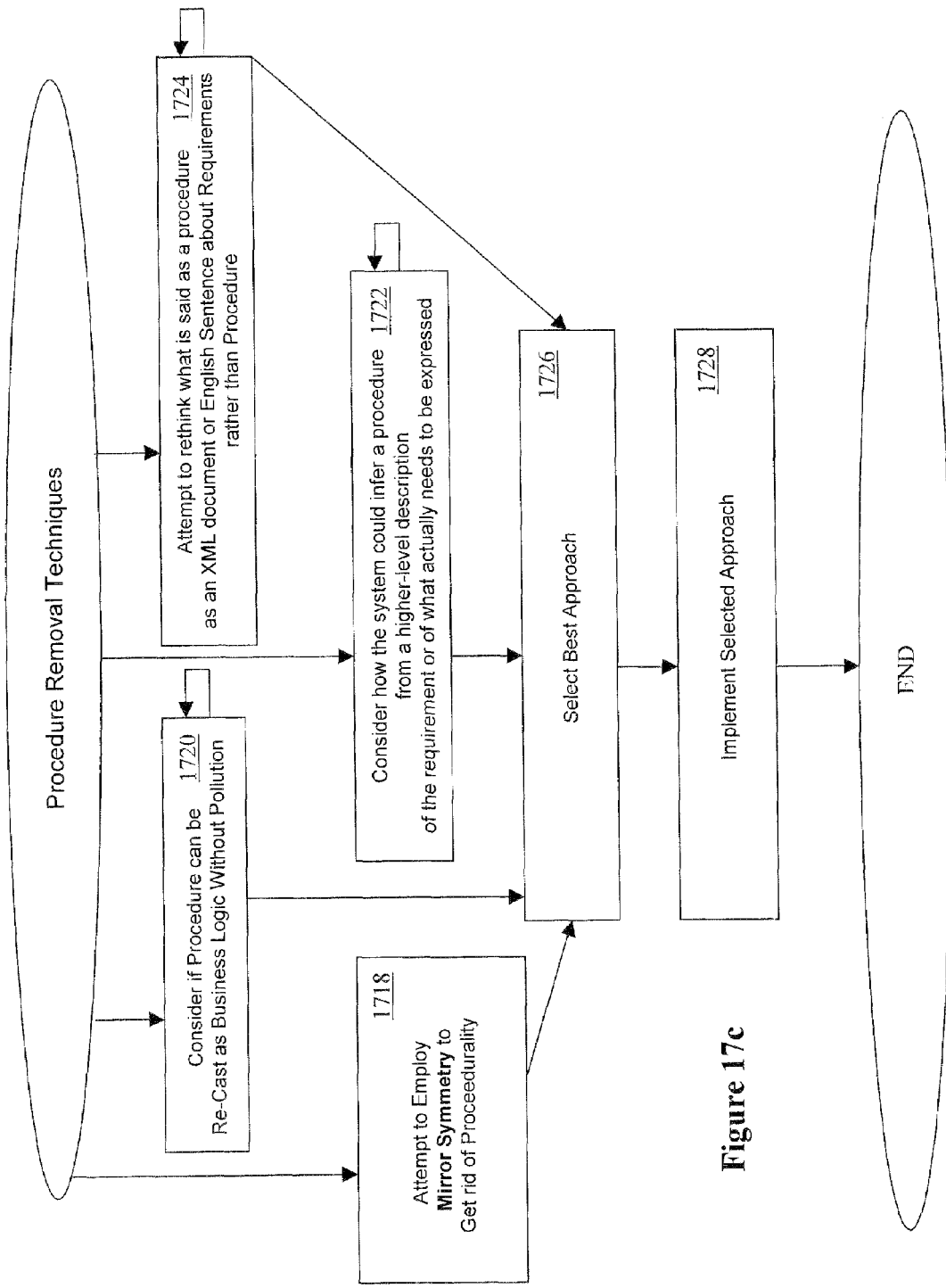
FIG. 17c illustrates a process for removing procedural elements.

FIG. 17c illustrates a process for removing procedural elements. Employing mirror composition is attempted to get rid of proceedurality (step 1718). Whether procedure can be re-cast as business logic is considered (step 1720). How the system could infer a procedure from a higher-level description of the requirement or of what actually needs to be expressed is considered (step 1722). Rethinking what is said as a procedure as an XML document or English sentence about requirements rather than procedure is attempted (step 1724). The best approach from these is selected (step 1726) and implemented (step 1728).

CONCLUSION

A system and method has been shown in the above embodiments for the effective implementation of an application development framework. While various embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by programming language, computing environment, or specific computing hardware.

The invention claimed is:

1. An application development framework comprising:
an inclusion mechanism to construct a visitor object that (a) performs operations on a object; (b) selects which objects are child objects of the parent object; and (c) selects a child visitor object for each of the child objects.

2. The framework, as per claim 1, wherein the visitor object selects a child visitor by requesting an identification of the child visitor object from the child object.

3. The framework, as per claim 1, wherein the visitor object is a transducer object whose operations on the parent object produces result data.

4. The framework, as per claim 3, wherein the transducer object is a view object and the result data is part of a user interface.

5. The framework, as per claim 4, wherein the parent object that a view object performs operations on is an editable domain object and the operations comprise viewing and modifying properties of the editable domain object.

6. The framework, as per claim 5, wherein a tree of view objects is constructed by constructing a plurality of view objects.

7. The framework, as per claim 6, wherein the user interface is a composition of each part produced by a view object in the tree of view objects.

8. The framework, as per claim 7, further comprising a debug mechanism that demarcates the part of the user interface produced by each view object.

9. The framework, as per claim 6, wherein the framework further comprises an automatic user interface tool to automatically generate the tree of view objects from a tree of editable domain objects.

10. The framework, as per claim 9, wherein the tree of editable domain objects is generated from example data.

11. The framework, as per claim 10, wherein the example data is created in XML.

12. The framework, as per claim 5, wherein the framework is packaged as a set of JSP tags.

13. The framework, as per claim 12, wherein a view object is a JSP page.

14. The framework, as per claim 13, wherein the inclusion mechanism is a subview tag that includes a sub-view JSP page in a parent JSP page such that the parent JSP page calls the sub-view JSP page when producing part of the user interface.

15. The framework, as per claim 14, wherein all of the set of JSP tags are implemented as subview tags such that for each tag, the parent JSP page calls a JSP page to implement the corresponding tag.

16. The framework, as per claim 15, wherein a JSP tag is automatically created from a JSP page.

17. The framework, as per claim 13, wherein the set of JSP tags includes a block tag to enable or hide portions of the user interface.

18. The framework, as per claim 13, wherein the set of JSP tags comprise widget tags to cause a JSP page to produce controls as part of the user interface.

19. The framework, as per claim 18, wherein the widget tags comprise collection tags for producing controls that edit collections of objects.

20. The framework, as per claim 19, wherein the legal values displayed in a control that edits collections of objects is determined by a domain object.

21. The framework, as per claim 5, further comprising:
an editor context class, wherein an instance of the editor context class is instantiated for at least one view object and associated with the editable domain object, the editor context instance functioning as a namespace for viewing and modifying the properties of the corresponding editable domain object.

22. The framework, as per claim 21, wherein the editable domain object is viewed and modified by requesting the editor context instance to get or set the property on the corresponding editable domain object.

23. The framework, as per claim 22, wherein the editor context instance gets or sets properties on the corresponding editable domain object via a model accessor.

24. The framework, as per claim 22, wherein the view object views and modifies an object other than the corresponding editable domain object by requesting a namespace other than the editor context instance to get or set the property on the other object.

25. The framework, as per claim 24, wherein the other namespace gets or sets properties on the other object via the model accessor.

26. The framework, as per claim 3, wherein the transducer object is an XML serializer object and the result data is XML serialization data.

27. An article of manufacture comprising a computer usable medium having computer readable program code embodied therein which implements a framework, the computer readable program code comprising:
computer readable program code for constructing a visitor object that (a) performs operations on a parent object; (b) selects which objects are child objects of the parent object; and (c) selects a visitor object for each of the child objects.

28. The article of manufacture, as per claim 27, wherein the visitor object selects a child visitor by requesting an identification of the child visitor object from the child object.

29. The article of manufacture, as per claim 27, wherein the visitor object is a transducer object whose operations on the parent object produces result data.

30. The article of manufacture, as per claim 29, wherein the transducer object is a view object and the result data is part of a user interface.

31. The article of manufacture, as per claim 30, wherein the parent object that a view object performs operations on is an editable domain object and the operations comprise viewing and modifying properties of the editable domain object.

32. The article of manufacture, as per claim 31, wherein a tree of view objects is constructed by constructing a plurality of view objects.

33. The article of manufacture, as per claim 32, wherein the user interface is a composition of each part produced by a view object in the tree of view objects.

34. The article of manufacture as per claim 33, wherein the computer readable program code further comprises:
   computer readable program code implementing a debug mechanism that demarcates the part of the user interface produced by each view object.

35. The article of manufacture as per claim 32, wherein the computer readable program code further comprises:
   computer readable program code implementing an automatic user interface tool to automatically generate the tree of view objects from a tree of editable domain objects.

36. The article of manufacture, as per claim 35, wherein the tree of editable domain objects is generated from example data.

37. The article of manufacture, as per claim 36, wherein the example data is created in XML.

38. The article of manufacture, as per claim 31, wherein the framework is packaged as a set of JSP tags.

39. The article of manufacture, as per claim 38, wherein a view object is a JSP page.

40. The article of manufacture, as per claim 39, wherein computer readable program code for constructing a visitor object implements a subview tag that includes a sub-view JSP page in a parent JSP page such that the parent JSP page calls the sub-view JSP page when producing part of the user interface.

41. The article of manufacture, as per claim 40, wherein all of the set of JSP tags are implemented as subview tags such that, for each tag, the parent JSP page calls a JSP page to implement the corresponding tag.

42. The article of manufacture, as per claim 41, wherein a JSP tag is automatically created from a JSP page.

43. The article of manufacture, as per claim 39, wherein the set of JSP tags includes a block tag to enable or hide portions of the user interface.

44. The article of manufacture, as per claim 39, wherein the set of JSP tags comprise widget tags to cause a JSP page to produce controls as part of the user interface.

45. The article of manufacture, as per claim 44, wherein the widget tags comprise collection tags for producing controls that edit collections of objects.

46. The article of manufacture, as per claim 45, wherein the legal values displayed in a control that edits collections of objects is determined by a domain object.

47. The article of manufacture, as per claim 31, wherein the computer readable program code further comprises:
   computer readable program code for instantiating an editor context for at least one view object in the tree of view objects and associating the editor context with the view object's corresponding editable domain object, the editor context instance functioning as a namespace for editing of the corresponding editable domain object.

48. The article of manufacture, as per claim 47, wherein the editable domain object is viewed and modified by requesting the editor context instance to get or set the property on the corresponding editable domain object.

49. The article of manufacture, as per claim 48, wherein the editor context instance gets or sets properties on the corresponding editable domain object via a model accessor.

50. The article of manufacture, as per claim 48, wherein the view object views and modifies an object other than the corresponding editable domain object by requesting a namespace other than the editor context instance to get or set the property on the other object.

51. The article of manufacture, as per claim 50, wherein the other namespace gets or sets properties on the other object via the model accessor.

52. The article of manufacture, as per claim 29, wherein the transducer object is an XML serializer object and the result data is XML serialization data.

53. A software framework to interconnect a model comprising a tree of editable domain objects; a view comprising a tree of view objects, wherein each view object is an editor of a corresponding domain object in the tree of editable domain objects and wherein each view object generates a part of a user interface; and at least one controller to translate user actions in the user interface to activity in the domain objects, the framework comprising:
   an editor context class, wherein an instance of the editor context class is instantiated for at least one view object and associated with the editable domain object, the editor context instance functioning as a namespace for editing the properties of the corresponding editable domain object
   an update manager to update domain objects via the associated editor context instance; and
   a request processor to receive requests that contain indications of user actions in the user interface and domain object updates, the request processor sending domain object updates to the update manager; calling a method on the controller to translate the user actions into activity in the domain objects; and calling a parent view object in the tree of view objects so that the user interface is generated.

54. The framework, as per claim 53, wherein the request processor receives requests via the parent view object in the tree of view objects.

55. The framework, as per claim 53, wherein the update manager performs selection updates after updates to domain object properties.

56. The framework, as per claim 53, wherein the update manager updates domain objects via the associated editor context instance by requesting the editor context instance to set or get properties on the corresponding editable domain object.

57. The framework, as per claim 56, wherein a domain object property is marked as invalid in context if there is a validation error while updating it and widgets in the user interface corresponding to the marked property are rendered with a configurable visual cue.

58. The framework, as per claim 56, further comprising:
   a model accessor, wherein the editor context instance gets or sets properties on the corresponding editable domain object via the model accessor.

59. The framework, as per claim 58, wherein the editable domain objects are Enterprise Java-Beans (EJBs) in an Enterprise Java-Bean container.

60. The framework, as per claim 59, wherein the model accessor logs sets or gets from the editor context and performs them as a single batch change.

61. The framework, as per claim 53, further comprising:
   a namespace dispatcher,
   wherein a view object edits an object other than the corresponding editable domain object by requesting a namespace other than the editor context instance to get or set the property on the other object; and
   wherein the namespace dispatcher receives the request to the other namespace and dispatches the request to the other namespace.

* * * * *